(12) United States Patent
Hermel et al.

(10) Patent No.: US 7,599,711 B2
(45) Date of Patent: Oct. 6, 2009

(54) SYSTEMS AND METHODS FOR ANALOG TRANSPORT OF RF VOICE/DATA COMMUNICATIONS

(75) Inventors: Michael J. Hermel, Waseca, MN (US); Larry G. Fischer, Waseca, MN (US); William J. Mitchell, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 583 days.

(21) Appl. No.: 11/279,480

(22) Filed: Apr. 12, 2006

(65) Prior Publication Data

US 2007/0243899 A1    Oct. 18, 2007

(51) Int. Cl.
    *H04M 1/00* (2006.01)
(52) U.S. Cl. .................. 455/553.1; 455/522; 455/69.1; 455/456.2; 455/456.5
(58) Field of Classification Search .............. 455/553.1, 455/426.1, 426.2, 456.5, 456.6, 522, 69.1
    See application file for complete search history.

(56) References Cited

U.S. PATENT DOCUMENTS

| | | | |
|---|---|---|---|
| 3,931,473 A | 1/1976 | Ferris, Jr. | |
| 4,101,834 A | 7/1978 | Stutt et al. | |
| 4,112,488 A | 9/1978 | Smith, III | |
| 4,144,409 A | 3/1979 | Utano et al. | |
| 4,144,411 A | 3/1979 | Frenkiel | |
| 4,231,116 A | 10/1980 | Sekiguchi et al. | |
| 4,244,046 A | 1/1981 | Brouard et al. | |
| 4,354,167 A | 10/1982 | Terreault et al. | |
| 4,402,076 A | 8/1983 | Krajewski | |
| 4,451,699 A | 5/1984 | Gruenberg | |
| 4,456,793 A | 6/1984 | Baker et al. | |
| 4,475,010 A | 10/1984 | Huensch et al. | |
| 4,485,486 A | 11/1984 | Webb et al. | |
| 4,525,861 A | 6/1985 | Freeburg | |
| 4,531,239 A | 7/1985 | Usui | |
| 4,556,760 A | 12/1985 | Goldman | |

(Continued)

FOREIGN PATENT DOCUMENTS

CA      2008900      1/1998

(Continued)

OTHER PUBLICATIONS

Wala, Philip, "A New Microcell Architecture Using Digital Optical Transport", 1993, pp. 585-588, Published in: US.

(Continued)

*Primary Examiner*—Tuan A Pham
(74) *Attorney, Agent, or Firm*—Fogg & Powers LLC

(57) ABSTRACT

Systems and methods for the analog transport of RF voice/data communications are provided. In one embodiment, a method for transporting analog multi-band RF signals is provided. The method comprises receiving a first multi-band RF signal from a first communications medium, the first multi-band RF signal including a first RF frequency band and one or more additional RF frequency bands; separating the first RF frequency band from the multi-band RF signal; varying a power level of the first RF frequency band; recombining the first RF frequency band with the one or more additional RF frequency bands into a second multi-band RF signal; and transmitting the second multi-band RF signal on a second communications medium.

21 Claims, 18 Drawing Sheets

U.S. PATENT DOCUMENTS

| | | |
|---|---|---|
| 4,596,051 A | 6/1986 | Feldman |
| 4,612,990 A | 9/1986 | Shu |
| 4,613,990 A | 9/1986 | Halpern |
| 4,669,107 A | 5/1987 | Eriksson-Lennartsson |
| 4,701,909 A | 10/1987 | Kavehrad et al. |
| 4,704,333 A | 11/1987 | Elkins et al. |
| 4,704,733 A | 11/1987 | Kawano |
| 4,718,004 A | 1/1988 | Dalal |
| 4,754,451 A | 6/1988 | Eng et al. |
| 4,759,051 A | 7/1988 | Han |
| 4,760,573 A | 7/1988 | Calvignac et al. |
| 4,790,000 A | 12/1988 | Kinoshita |
| 4,797,947 A | 1/1989 | Labedz |
| 4,816,825 A | 3/1989 | Chan et al. |
| 4,831,662 A | 5/1989 | Kuhn |
| 4,849,963 A | 7/1989 | Kawano et al. |
| 4,916,460 A | 4/1990 | Powell |
| 4,920,533 A | 4/1990 | Dufresne et al. |
| 4,932,049 A | 6/1990 | Lee |
| 4,959,829 A | 9/1990 | Griesing |
| 4,977,593 A | 12/1990 | Ballance |
| 5,067,147 A | 11/1991 | Lee |
| 5,067,173 A | 11/1991 | Gordon et al. |
| 5,084,869 A | 1/1992 | Russell |
| 5,136,410 A | 8/1992 | Heiling et al. |
| 5,138,440 A | 8/1992 | Radice |
| 5,159,479 A | 10/1992 | Takagi |
| 5,175,867 A | 12/1992 | Wejke et al. |
| 5,193,109 A | 3/1993 | Chien-Yeh Lee |
| 5,243,598 A | 9/1993 | Lee |
| 5,251,053 A | 10/1993 | Heidemann |
| 5,267,261 A | 11/1993 | Blakeney, II et al. |
| 5,272,700 A | 12/1993 | Hansen et al. |
| 5,278,690 A | 1/1994 | Vella-Coleiro |
| 5,280,472 A | 1/1994 | Gilhousen et al. |
| 5,285,469 A | 2/1994 | Vanderpool |
| 5,297,193 A | 3/1994 | Bouix et al. |
| 5,299,168 A | 3/1994 | Kang |
| 5,301,056 A | 4/1994 | O'Neill |
| 5,303,287 A | 4/1994 | Laborde |
| 5,305,308 A | 4/1994 | English et al. |
| 5,309,474 A | 5/1994 | Gilhousen et al. |
| 5,313,461 A | 5/1994 | Ahl et al. |
| 5,339,184 A | 8/1994 | Tang |
| 5,381,459 A | 1/1995 | Lappington |
| 5,392,453 A | 2/1995 | Gudmundson et al. |
| 5,442,700 A | 8/1995 | Snell et al. |
| 5,457,557 A | 10/1995 | Zarem et al. |
| 5,586,121 A | 12/1996 | Moura et al. |
| 5,587,734 A | 12/1996 | Lauder et al. |
| 5,603,080 A | 2/1997 | Kallander et al. |
| 5,621,786 A | 4/1997 | Fischer et al. |
| 5,627,879 A | 5/1997 | Russell et al. |
| 5,630,204 A | 5/1997 | Hylton et al. |
| 5,642,405 A | 6/1997 | Fischer et al. |
| 5,644,622 A | 7/1997 | Russell et al. |
| 5,657,374 A | 8/1997 | Russell et al. |
| 5,765,097 A | 6/1998 | Dail |
| 5,765,099 A | 6/1998 | Georges et al. |
| 5,774,085 A | 6/1998 | Yanagimoto et al. |
| 5,774,660 A | 6/1998 | Brendel et al. |
| 5,774,789 A | 6/1998 | van der Kaay et al. |
| 5,802,173 A | 9/1998 | Hamilton-Piercy et al. |
| 5,809,395 A | 9/1998 | Hamilton-Piercy et al. |
| 5,852,651 A | 12/1998 | Fischer et al. |
| 5,878,325 A | 3/1999 | Dail |
| 5,946,622 A | 8/1999 | Bojeryd |
| 5,949,370 A * | 9/1999 | Smith et al. ................. 342/354 |
| 5,969,837 A | 10/1999 | Farber et al. |
| 6,112,086 A | 8/2000 | Wala |
| 6,122,529 A | 9/2000 | Sabat, Jr. et al. |
| 6,147,786 A | 11/2000 | Pan |
| 6,198,558 B1 | 3/2001 | Graves et al. |
| 6,223,021 B1 | 4/2001 | Silvia et al. |
| 6,349,200 B1 | 2/2002 | Sabat, Jr. et al. |
| 6,362,908 B1 | 3/2002 | Kimbrough et al. |
| 6,374,124 B1 | 4/2002 | Slabinski |
| 6,396,908 B1 | 5/2002 | O'Donovan et al. |
| 6,486,907 B1 | 11/2002 | Farber et al. |
| 6,496,290 B1 | 12/2002 | Lee |
| 6,643,498 B1 | 11/2003 | Miyajima |
| 6,704,545 B1 | 3/2004 | Wala |
| 6,801,767 B1 * | 10/2004 | Schwartz et al. ......... 455/426.2 |
| 2001/0031014 A1 | 10/2001 | Subramanian et al. |
| 2003/0133182 A1 | 7/2003 | Ng et al. |
| 2003/0143947 A1 | 7/2003 | Lyu |
| 2003/0162516 A1 | 8/2003 | Solum |
| 2004/0106387 A1 | 6/2004 | Bauman et al. |
| 2004/0106435 A1 | 6/2004 | Bauman et al. |
| 2004/0203339 A1 | 10/2004 | Bauman |

FOREIGN PATENT DOCUMENTS

| | | |
|---|---|---|
| DE | 3707244 A | 9/1988 |
| EP | 0166885 | 1/1986 |
| EP | 0346925 | 12/1989 |
| EP | 0368673 | 5/1990 |
| EP | 0391597 | 10/1990 |
| EP | 0468688 | 1/1992 |
| EP | 0664621 | 7/1995 |
| FR | 2345865 | 10/1977 |
| JP | 58164007 | 9/1983 |
| JP | 3026031 | 2/1991 |
| WO | 0182642 | 11/2001 |
| WO | 03079645 | 9/2003 |
| WO | 2006135697 | 12/2006 |

OTHER PUBLICATIONS

Merrett et al., "A Cordless Access System Using Radio-Over-Fibre Techniques", "41st IEEE Vehicular Technology Conference Gateway Fo the Future Technology in Motion", May 19, 1991, pp. 921-924, Published in: St.Louis, MO.

Lee, "Intelligent Microcell Applications in PCS", "43rd IEEE Vehicular Technology Conference, May 18-20, 1993 Personal Communication-Freedom Through Wireless Technology", May 18-20, 1993, pp. 722-725, Publisher: PACTEL Corporation, Published in: Secaucus, NJ.

Lewis, "ADC-Kentrox Call Report With Bell Atlantic", Oct. 18, 1992.

ADC Kentrox, "ADC Kentrox Introduces Innovative Wireless Network Access Solution Cellular Subscribers Offered a New Level of Portable", Mar. 1, 1993, Publisher: ADC Kentrox, Published in: Portland, OR.

"ADC Kentrox Wireless Systems Group Citycell 824 a Positioning White Paper", Mar. 1993, Publisher: Cita Trade Show.

"And Now a Few Words From Your Customers", "And Now a Few Words From Your Customers", Aug. 1992, pp. 1-4, Publisher: ADC Kentrox, Published in: Portland, OR.

Foxcom Wireless Proprietary Information, "Application Note Rfiber-RF Fiberoptic Links for Wireless Applications", 1998, pp. 3-11.

Cox, "A Radio System Proposal for Widespread Low-Power Tetherless Communications", "IEEE Transactions on Communications", Feb. 1991, pp. 324-335, vol. 39, No. 2, Publisher: IEEE.

Ishio, "A Two-Way Wavelength-Division-Multiplexing Transmission and its Application to a Switched TV-Distribution System", , Publisher: Ekectrial Communication Laboratories, Nipon Telegraph and Telepone Corporation , Published in: Yokosuka, Japan.

Ameritech, "Broadband Optical Transport Digital Microcell Connection Service-Interface and Performance Specifications a Technical D", "Cellular Industry", Oct. 1993, pp. 1-26, Publisher: The Day Group.

City Cell, Cellular Industry the Day Group, "ADC Kentrox Citycell Field Trial Yields Another First- Simultaneous Analog and Digital Calls".

Stern, "Passive Optical Local Networks for Telephony Applications and Beyond", "Electronics Letters an International Publication", Nov. 19, 1987, pp. 1255-1257, vol. 23, No. 24, Publisher: IEEE.

"ADC Kentrox Introduces Citycell 824, a Replacement for Conventional Cell Sites; Company's Original Goal was to Improve F", "Telocator Bulletin", Feb. 1993.

Tang, "Fiber Optic Antenna Remoting for Multi-Sector Cellular Cell Sites", "GTE Laboratories Abstract", Jun. 14-18, 1992.

ADC Kentrox, "First Field Trial Results Exceed Expectations ADC Kentrox and Cellular One Join Force to Provide a New Level of Portable", Mar. 2, 1993, Publisher: ADC Kentrox, Published in: Portland, OR.

Fischer et al., "U.S. Appl. No. 09/747,273, filed Dec. 22, 2000".

Payne et al., "Single Mode Optical Local Networks", "Globecom '85 IEEE Global Telecommunications Conference", Dec. 2-5, 1985, pp. 1201-1206, vol. 3 of 3, Publisher: IEEE, Published in: New Orleans,LA.

Steele, "Towards a High-Capacity Digital Cellular Mobile Radio System", "IEE Proceedings-F Special Issue on Land Mobile Radio", Aug. 1985, pp. 405-415, vol. 132, PT F, No. 5, Publisher: IEEE.

Akos et al., "Direct Bandpass Sampling of Multiple Distinct RF Signals", "IEEE Transactions on Communications", Jul. 1999, pp. 983-988, vol. 47, No. 7.

Titch, "Kentrox Boosts Coverage and Capacity", "Telephony", Jan. 25, 1993.

Gupta et al., "Land Mobile Radio Systems-A Tutorial Exposition", "IEEE Communications Magazine", Jun. 1985, pp. 34-45, vol. 23, No. 6, Publisher: IEEE.

Foxcom Wireless Properietary Information, "Litenna In Building RF Distribution System", 1998, pp. 1-8, Publisher: Foxcom Wireless, Published in: US.

Schneiderman, "Offshore Markets Gain in Size, Competitiveness Even the Smallest Industry Companies are Expanding Their Global Buisness", "Microwaves and RF", Mar. 1993, pp. 33-39, vol. 32, No. 3, Publisher: Penton Publishing, Inc, Published in: Berea, OH.

"Digital Transport for Cellular", "Microwaves and RF", Feb. 1993, Published in: Portland, OR.

Russell, "New Microcell Technology Sets Cellular Carriers Free", "Telephony", Mar. 1993, pp. 40, 42, and 46.

Kobb, "Personal Wireless", "IEEE Spectrum", Jun. 1993, pp. 20-25, Publisher: IEEE.

Nakatsugawa et al., "Software Radio Base and Personal Stations for Cellular-PCS Systems", 2000, pp. 617-621, Publisher: IEEE.

Quinn, "The Cell Enhancer", 1982, pp. 77-83, Publisher: Bell Atlantic Mobile Systems.

"Urban Microcell System Layout-Presentation", Jun. 14-18, 1992, Publisher: GTE Laboritories.

O'Byrne, "TDMA and CDMA in a Fiber-Optic Environment", "Vehicular Technology Society 42nd VTS Conference Frontiers of Technology From Pioneers to the 21st Century", May 10-13, 1992, pp. 727-731, vol. 2 of 2, Publisher: GTE Laboratories Inc., Published in: Denver, CO.

Zonemaster, "Maximum Coverage for High-Capacity Locations", 1993, Publisher: Decibel Multi Media Microcell System, Published in: US.

Cellular Industry, The Day Group, "New Signal Transport Technology Digitizes the Cellular Band", Dec. 22, 2000.

* cited by examiner

SYSTEMS AND METHODS FOR ANALOG TRANSPORT OF RF VOICE/DATA COMMUNICATIONS

BACKGROUND

The number of wireless information and communication services available to the public is constantly increasing. These wireless information and communication services include, but are not limited to, cellular telephones, PCS, messaging and paging, broadband internet access, wireless local network access, and the like. In order for these services to co-exist without interfering with each other, each service is assigned to operate within specified radio frequency (RF) bands and channels. Inside buildings and other enclosed spaces, it can often be difficult for subscribers to communicate with their wireless service providers because the RF signals used to carry the information and communications is attenuated or blocked entirely by structural elements of the building.

For the reasons stated above and for other reasons stated below which will become apparent to those skilled in the art upon reading and understanding the specification, there is a need in the art for systems and methods for a wireless communication solution that allows subscribers within buildings to access their wireless service providers.

SUMMARY

The Embodiments of the present invention provide systems and methods for the analog transport of RF voice/data communications and will be understood by reading and studying the following specification.

In one embodiment, a communications system is provided. The system comprises a host unit adapted to communicate with one or more service providers; at least one remote unit adapted to communicate with the host unit; and at least one communications medium coupled between the host unit and the at least one remote unit, wherein the host unit and the at least one remote unit are adapted to communicate analog RF signals via the at least one communications medium; wherein the host unit is adapted to receive a plurality of forward path RF signals from the one or more service providers as a first multiband RF signal including a first RF frequency band and one or more additional RF frequency bands; wherein the host unit is further adapted to separate the first RF frequency band from the first multi-band RF signal, vary a power level of the first RF frequency band, and recombine the first RF frequency band with the one or more additional RF frequency bands as a second multi-band RF signal.

In another embodiment, a method for transporting analog multi-band RF signals is provided. The method comprises receiving a first multi-band RF signal from a first communications medium, the first multi-band RF signal including a first RF frequency band and one or more additional RF frequency bands; separating the first RF frequency band from the multi-band RF signal; varying a power level of the first RF frequency band; recombining the first RF frequency band with the one or more additional RF frequency bands into a second multi-band RF signal; and transmitting the second multi-band RF signal on a second communications medium.

In yet another embodiment, an automatic gain control method is provided. The method comprises receiving a plurality of pilot tones at a plurality of frequencies from a common communications medium; calculating a power loss for each of the plurality of pilot tones; determining a power loss versus RF frequency relationship for the common communications medium based on the calculated power loss for each of the plurality of pilot tones; estimating a power loss for an RF signal in an RF frequency band based on the power loss versus RF frequency relationship; and varying an attenuation of the RF signal based on the estimated power loss for the RF signal.

In still another embodiment, a system for implementing automatic gain control for a communications medium is provided. The system comprises means for receiving a plurality of pilot tones at a plurality of frequencies from a common communications medium; means for calculating a power loss for each of the plurality of pilot tones, the means for calculating a power loss responsive to the means for receiving the plurality of pilot tones; means for determining a power loss versus RF frequency relationship for the common communications medium based on the calculated power loss for each of the plurality of pilot tones, the means for determining the power loss versus RF frequency relationship responsive to the means for calculation the power loss; means for estimating a power loss for an RF frequency band based on the power loss versus RF frequency relationship, the means for estimating a power loss for an RF frequency band responsive to the means for determining a power loss versus RF frequency relationship; and means for varying a power level of one or more RF signals in the RF frequency band based on an estimated power loss for the RF frequency band, the means for varying the power level responsive to the means for estimating the power loss.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide and intra-building coverage solution for distributing wireless data and communications services. Embodiments of the present invention allow users within a building, or other designated facility, to wirelessly access a plurality of voice and data (voice/data) services offered by a variety of data and communication service providers such as, but not limited to cellular telephone, PCS, third generation (3G) wireless networks, paging, local and wide area networks and broadband internet. Although several embodiments described in this specification illustrate using the present invention within a building or other enclosed area, the full scope of embodiments of the present invention are not limited to only indoor applications. For example, other contemplated embodiments of the present invention include outdoor areas (such as courtyards, patios, parking lots, and fields, for example) or hybrid installations that include both indoor and outdoor coverage areas.

Figure 1:
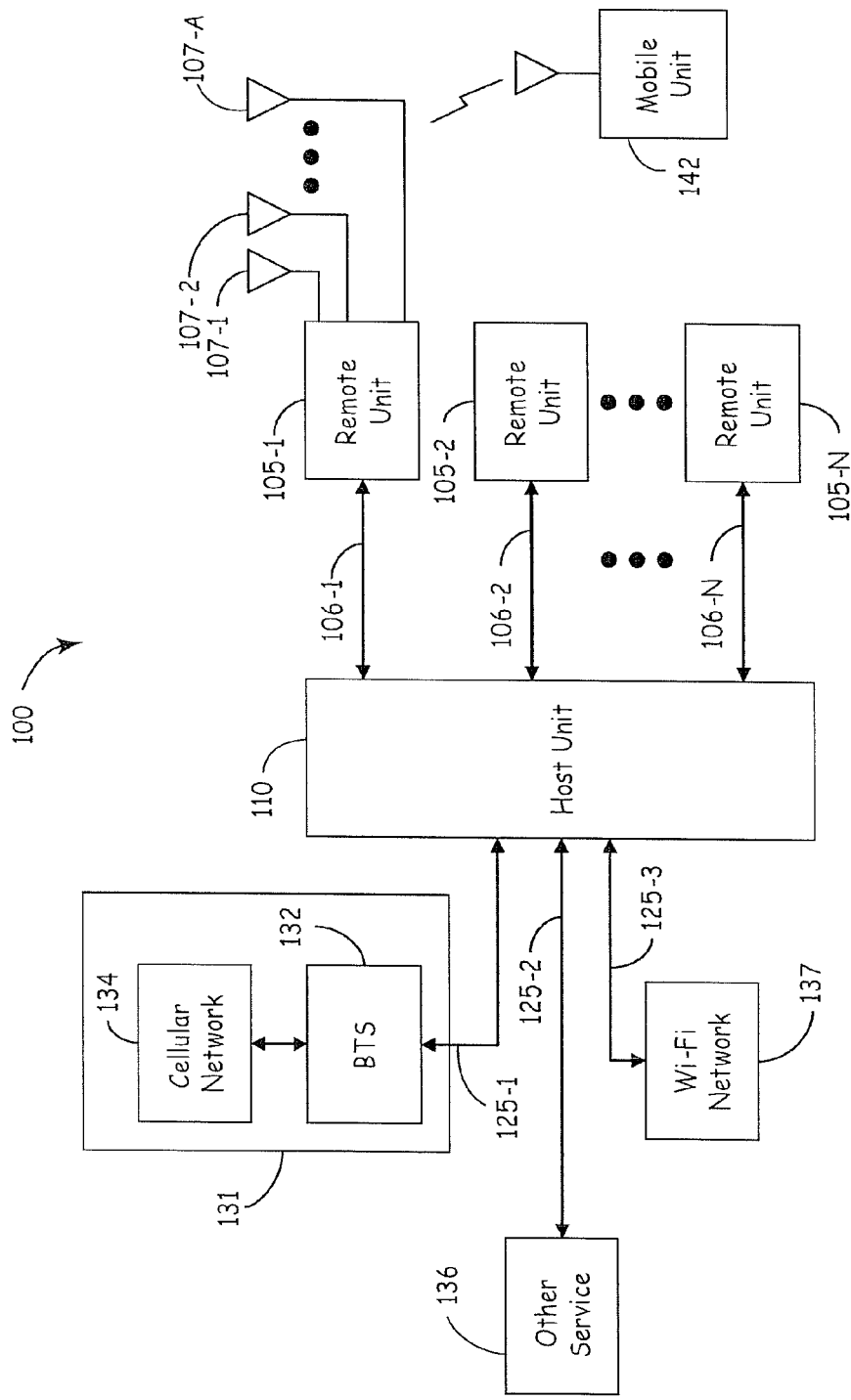
FIG. 1 is a block diagram illustrating a communication system 100 of one embodiment of the present invention.

FIG. 1 is a block diagram illustrating a communication system 100 of one embodiment of the present invention. System 100 comprises a host unit 110 coupled to one or more remote units, such as remote units 105-1 to 105-N. Host unit 110 communicates to one or more service providers via one or more radio frequency (RF) signal communication links. In one embodiment, the RF signal communication links are implemented using a physical communications medium such as, but not limited to, coaxial cables, twisted pair wires and optical cables. In one embodiment, the communications links to the one or more service providers are implemented using wireless RF communications links. In some embodiments, the communications links include a combination of physical communications media and wireless RF communications links.

In one embodiment, the service providers include at least one cellular communications service provider 131. In such an embodiment, host unit 110 is coupled to an upstream base station 132 (BTS) which in turn is coupled to a cellular communications network 134. Host unit 110 is coupled to BTS 132 via communications link 125-1. In alternate embodiments, communications link 125-1 comprises physical communications media, wireless RF communications links, or a combination thereof. BTS 132 includes all the functionality required to format voice/data signals received from cellular communications network 134 for transport as RF signals to host unit 110 via communications link 125-1. BTS 132 also includes all the functionality required to format RF signals received from host unit 110 into voice/data signals for transport on cellular communications network 134.

In one embodiment, the service providers include other services 136 such as, but not limited to paging services, local and wide area networks, audio and video programming, and broadband internet, coupled to host unit 110 via communications link 125-2. In alternate embodiments, communications link 125-3 comprises one or more of a physical communications media, wireless RF communications links, or a combination thereof. In one embodiment, host unit 110 is further coupled to a wireless network 137, such as but not limited to an IEEE 802.11 network, or an IEEE 802.16 network, via communications link 125-3. In alternate embodiments, communications link 125-3 comprises one or more of a physical communications media, wireless RF communications links, or a combination thereof. In such an embodiment, host unit 110 communicates RF signals between the wireless network 137 and a mobile unit 142.

Host unit 110 is coupled to the one or more remote units 105-1 to 105-N via communications links 106-1 to 106-N. In one embodiment, communications links 106-1 to 106-N include one or more of, but not limited to, coaxial cables, twisted pair wires, optical cables, or a combination thereof. Remote units 105-1 to 105-N are positioned at locations within a building or other facility and wirelessly transmit and receive voice/data information via RF signals with mobile units 142 that access voice/data services from one or more of cellular communications service provider 131, wireless network 137, and other services 136.

Voice/data signal to and from each of these service providers is transported within assigned RF frequency bands and voice/data information traveling through system 100 is processed using an analog radio frequency (RF) transport.

Figure 2A:
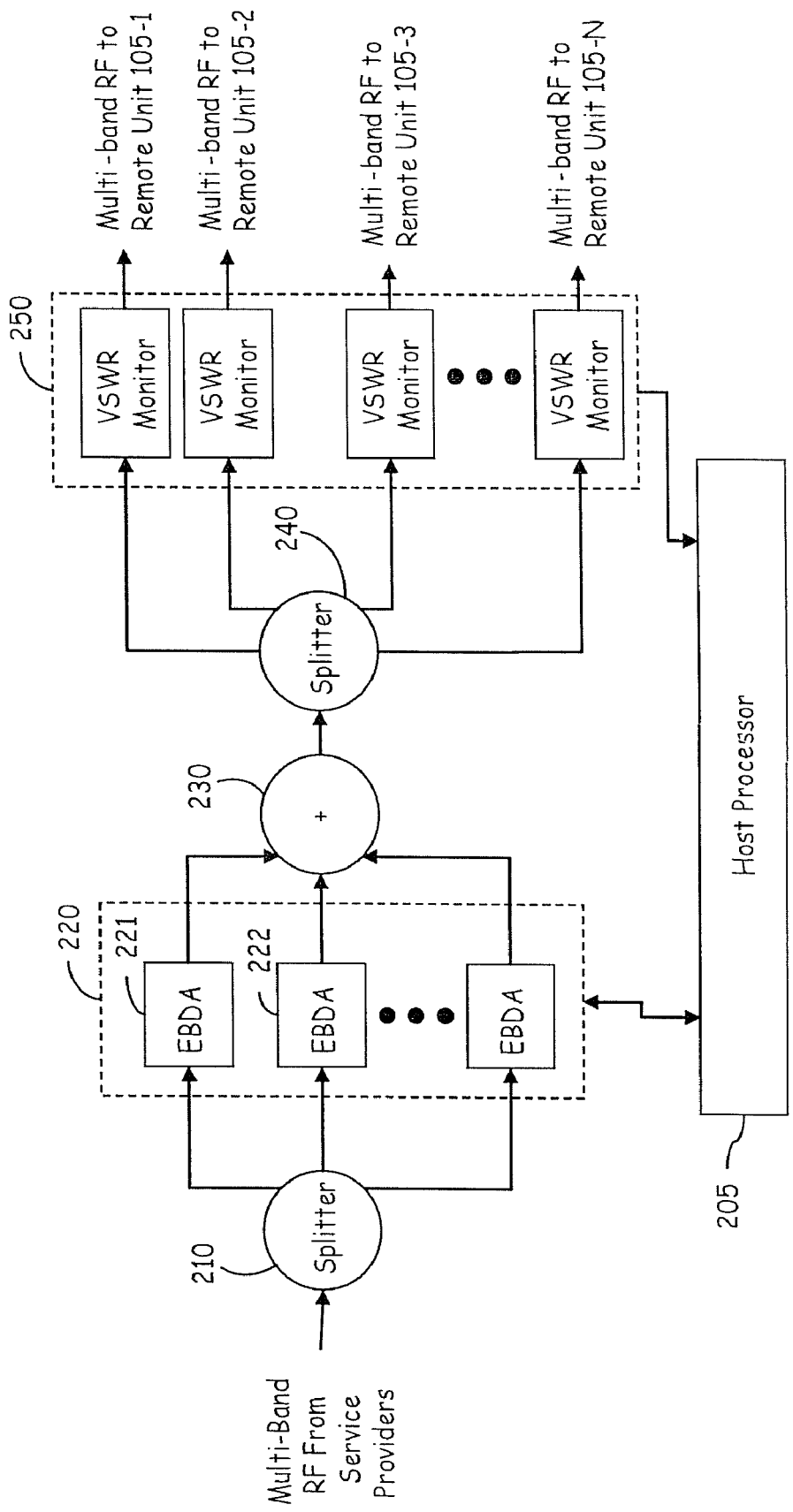
FIGS. 2A and 2B are diagrams illustrating a forward and reverse path, respectively, for a host unit of one embodiment of the present invention.
Figure 2B:
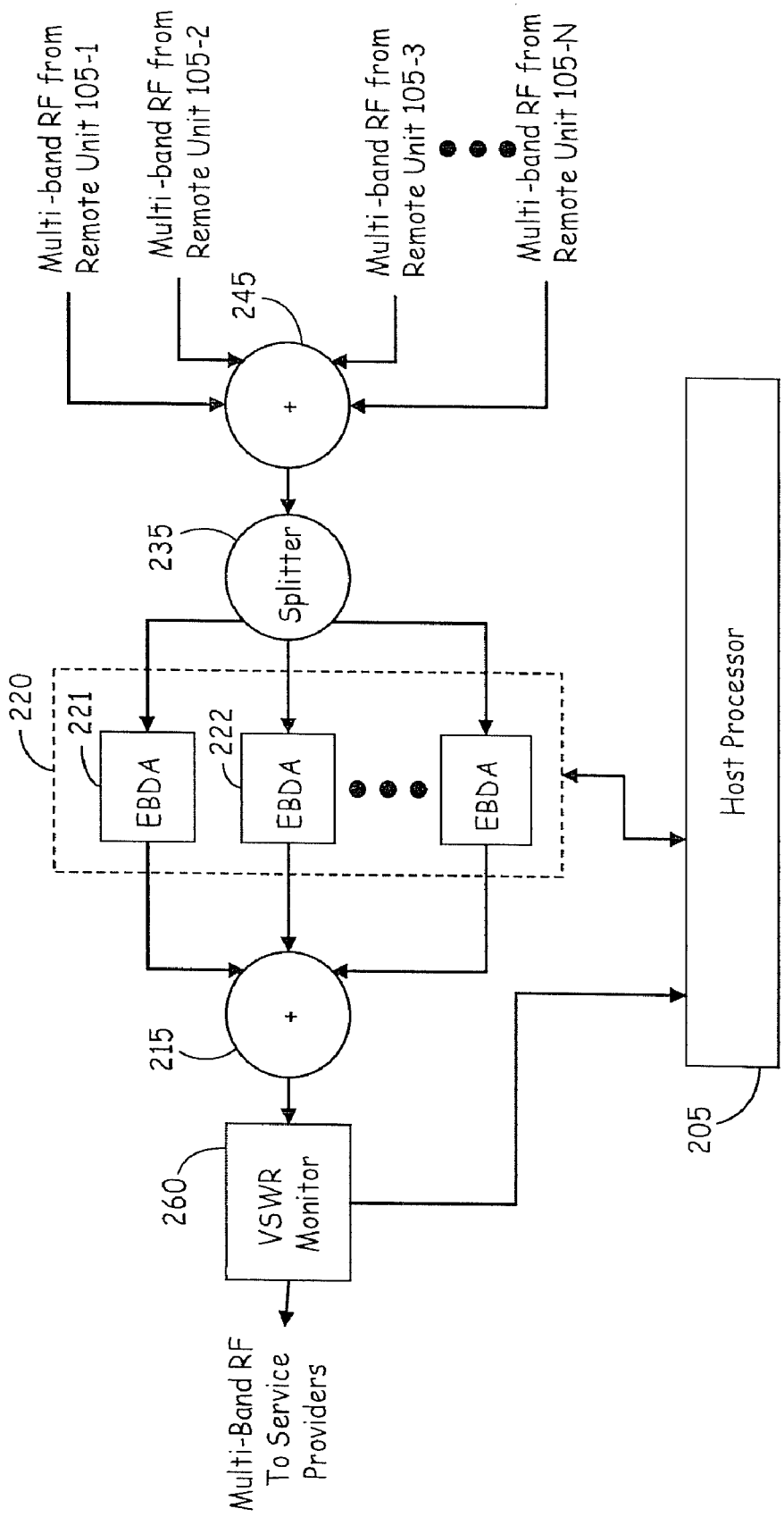

FIGS. 2A and 2B are block diagrams illustrating the flow of voice/data information through the analog RF transport of host unit 110, in the forward and reverse path respectively.

As illustrated in FIG. 2A, in operation in the forward path host unit 110 receives RF signals transmitted by one or more of cellular communications service provider 131, wireless network 137, and other services 136, as multiple signals in different RF frequency bands. In one embodiment, these RF signals are received by host unit 110 as a single multi-band RF signal. In one embodiment, host unit 110 incorporates multiple signals into a single multi-band RF signal. As would be appreciated by one skilled in the art upon reading this specification, because data from each service provider is communicated within separate RF frequency bands assigned to each service provider, combining analog RF signals from each service provider into a single multi-band RF signal is readily accomplished without data distortion due to signal overlap.

The multi-band RF signal is received at splitter 210 and forwarded to a plurality of enhanced bidirectional amplifier EBDA modules 220 (discussed in greater detail below). A "splitter", as the term is used in this specification, means a device that receives an RF signal input and replicates the RF signal to each of a plurality of outputs. In one embodiment, each EBDA module is associated with a specific RF frequency band and performs signal processing on RF signals within that RF frequency band. For example, in one embodiment, EBDA module 221 performs signal processing on RF signals within an 800-850 MHz frequency band, while EBDA module 222 performs signal processing on RF signals within a 1.0-1.5 GHz frequency band. In one embodiment, EBDA modules 220 separate their assigned specific RF frequency band from the multi-band RF signal. For example, in one embodiment, each of EBDA modules 220 filters out RF signals that are outside of their assigned RF frequency band. The resulting output of each of EBDA modules 220 is a processed single band RF signal. The output of the EBDA modules 220 is combined back into a multi-band RF signal by RF signal combiner 230. A "combiner", as the term is used in this specification, means a device that receives a plurality of analog RF signal inputs and combines the analog RF signals into a multi-band RF signal. This multi-band RF signal is received at splitter 240 and provided to each of remote units 105-1 to 105-N via communications links 106-1 to 106-N. In one embodiment, the power of the multi-band RF signal provided to each of communications links 106-1 to 106-N is monitored by voltage standing wave ratio (VSWR) monitors 250, as described in greater detail below.

FIG. 2B illustrates the operation of the reverse path of host unit 110 of one embodiment of the present invention. Host unit 110 receives a plurality of multi-band RF signals from remote units 105-1 to 105-N and combines the several multi-band RF signals into a single multi-band RF signal at combiner 245. The multi-band RF signal is received at splitter 235 and forwarded to the plurality of EBDA modules 220 (discussed in greater detail below). As discussed above, each EBDA module is assigned to perform signal processing to RF signals within a specific RF frequency band. In one embodiment, EBDA modules 220 separate their assigned specific reverse path RF frequency band from the multi-band RF signal. The RF frequency band assigned to each EBDA module in the reverse path is not necessarily the same RF frequency band assigned to that EBDA module in the forward path. For example, in one embodiment, EBDA module 221 performs signal processing on RF signals in the reverse path within an 900-950 MHz frequency band, while EBDA module 222 performs signal processing on RF signals in the reverse path within a 2.0-2.5 GHz frequency band. The output of the EBDA modules 220 is combined back into a multi-band RF signal by RF signal combiner 215. Host unit 110 transmits this multi-band RF signal output to one or more of one or more of cellular communications service provider 131, wireless network 137, and other services 136 via respective communications links 125-1, 125-3 and 125-2.

As would be appreciated by one skilled in the art upon reading this specification, forward and reverse path RF signals can be simultaneously transported as analog signals on the same physical transport. For example, in one embodiment, splitter 240 and combiner 245 may be incorporated into the same physical device that splits forward path RF signals as described above and combines reverse RF path signals as described above. Similarly, in one embodiment, splitter 210 and combiner 215 may be incorporated into the same physical device that splits forward path RF signals and combines reverse RF path signals. Combiner 230 and splitter 235 may be incorporated into the same physical device that combines forward path RF signals as described above and splits reverse RF path signals as described above.

Figure 3:
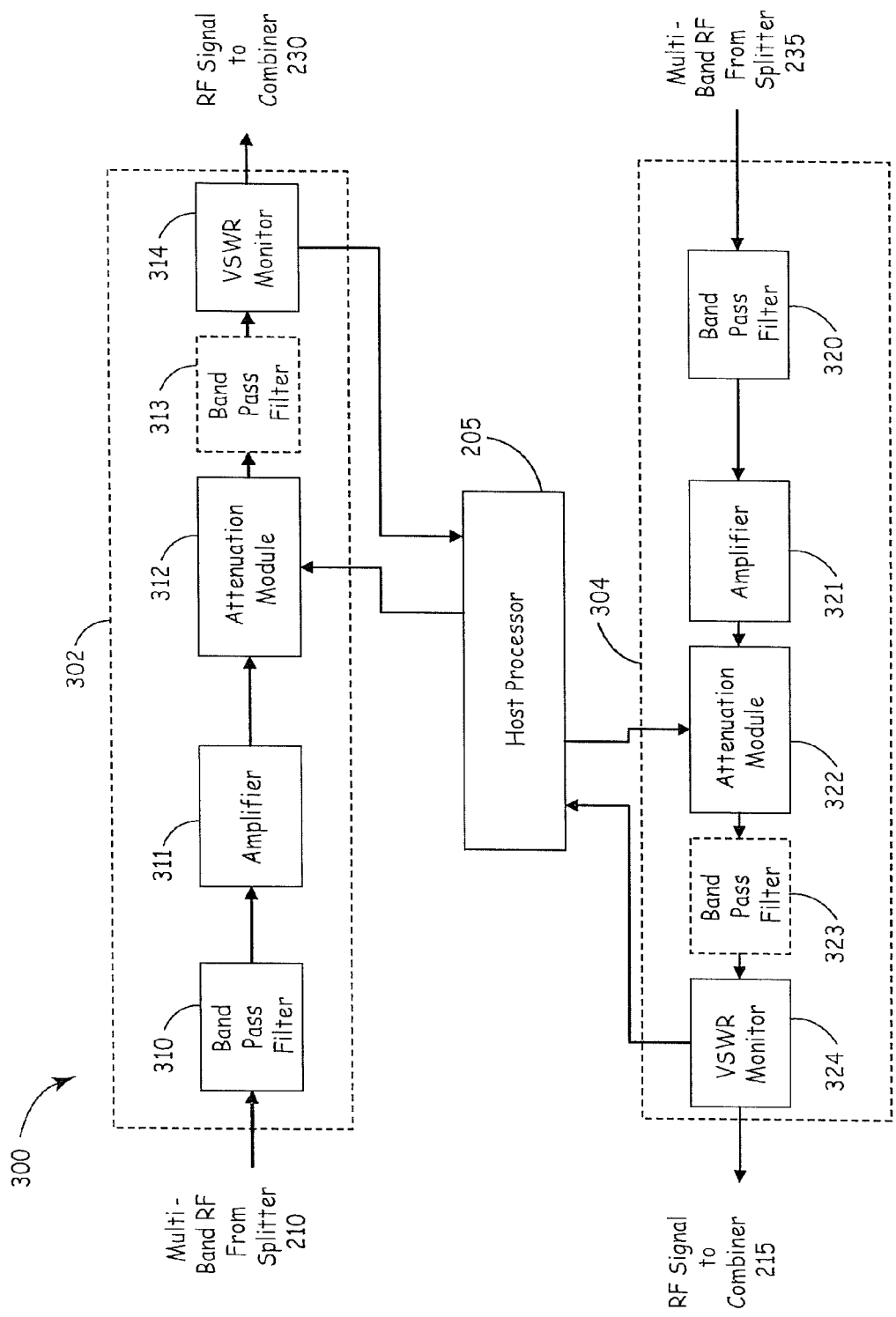
FIG. 3 is a block diagram illustrating a host unit enhanced bidirectional amplifier of one embodiment of the present invention.

FIG. 3 is a block diagram illustrating a host unit EBDA module 300, such as EBDA modules 220 discussed with respect to FIG. 2. EBDA module 300 provides amplification for both forward and reverse path RF signals and performs several signal processing functions on RF signals in both the forward and reverse path. These signal processing functions include, but are not limited to signal attenuation control, input drive level adjustment, and dynamic monitoring and management of signal levels to prevent overdriving of electronics. In addition, EBDA module 300 performs monitoring and control functions, such as RF signal power monitoring and software driven shutdown of an individual RF frequency band. EBDA module 300 includes forward path functions 302 and reverse path functions 304.

In the forward path, EBDA module 300 includes a band pass filter 310, an amplifier 311, a variable RF signal attenuation module 312, and a voltage standing wave ratio (VSWR) monitor 314. In operation in one embodiment, EBDA module 300 receives a multi-band RF signal from splitter 210 and band pass filter 310 filters out RF signals outside the RF frequency band assigned to EBDA module 300. Amplifier 311 provides amplification to the filtered RF signal to ensure the RF signal power is adequate for transport to the remote units. Attenuation module 312 receives the filtered RF signal and attenuates the RF signal based on instructions received from a host processor 205 coupled to EBDA module 300. VSWR monitor 314 measures the signal power of the RF signal output from attenuation module 312. In one embodiment, the RF signal is then provided to combiner 230. In one embodiment, an optional band pass filter 313 filters from the forward path RF signal any RF noise outside the RF frequency band assigned to EBDA module 300, which may have been introduced by EBDA module 300.

Based on the VSWR monitor 314 power measurements, host processor 205 can dynamically determine the RF signal power output for each of the EBDA modules 220 in host 110. Measuring the power output of each of the EBDA modules 220 enables host processor 205 to identify forward path power fluctuations and anomalies within specific RF frequency bands. Further, having a variable attenuator, such as attenuation module 312, within each of EBDA modules 220 enables host processor 205 to adjust the signal power within a specific RF frequency band without necessarily altering the power levels of RF signals outside of that RF frequency band. In addition, host processor 205 can shut down further processing of RF signals within any specific RF frequency band by adjusting the corresponding attenuation module 312 to provide a zero power level output.

In the reverse path, EBDA module 300 includes a band pass filter 320, a variable RF signal attenuation module 322, and a voltage standing wave ratio (VSWR) monitor 324. In operation in one embodiment, EBDA module 300 receives a reverse path multi-band RF signal from splitter 235 and band pass filer 329 filters out RF signals outside the reverse path RF frequency band assigned to EBDA module 300. Amplifier 321 provides amplification to the filtered RF signal. Attenuation module 322 receives the filtered RF signal and attenuates the RF signal based on instructions received from host processor 205. VSWR monitor 324 measures the signal power of the RF signal output from attenuation module 312. In one embodiment, the RF signal is then provided to combiner 215. In one embodiment, an optional band pass filter 323 filters from the reverse path RF signal any RF noise outside the RF frequency band assigned to EBDA module 300, which may have been introduced by EBDA module 300.

Based on the VSWR monitor 324 power measurements, the host processor 205 can dynamically determine the reverse path RF signal power output from each of the EBDA modules 220. Measuring the power output from each of the EBDA modules 220, enables host processor 205 to identify reverse path power fluctuations and anomalies within specific RF frequency bands. Further, control of the variable attenuation module (such as attenuation module 322) within each of EBDA modules 220 enables host processor 205 to adjust the signal power within a specific RF frequency band without necessarily altering the power levels of RF signals outside of that RF frequency band. In addition, host processor can shut down further processing of RF signals within any specific reverse path RF frequency band by adjusting the corresponding attenuation module 322 to provide a zero power level output.

In addition to having VSWR modules located within each of EBDA modules 220, in one embodiment, host unit 110 includes VSWR modules 250 and 260. VSWR modules 250 monitor the power level of the multi-band RF signal output from host unit 110 onto each of communication links 106-1 to 106-N. VSWR modules 250 thus enable host processor 205 to dynamically monitor the forward path power level to each of remote units 105-1 to 105-N. VSWR module 260 monitors the power level of the multi-band RF signal output from host unit 110 to the service providers, enabling host processor 205 to dynamically monitor host unit 110's reverse path RF signal power level output.

Figure 4A:
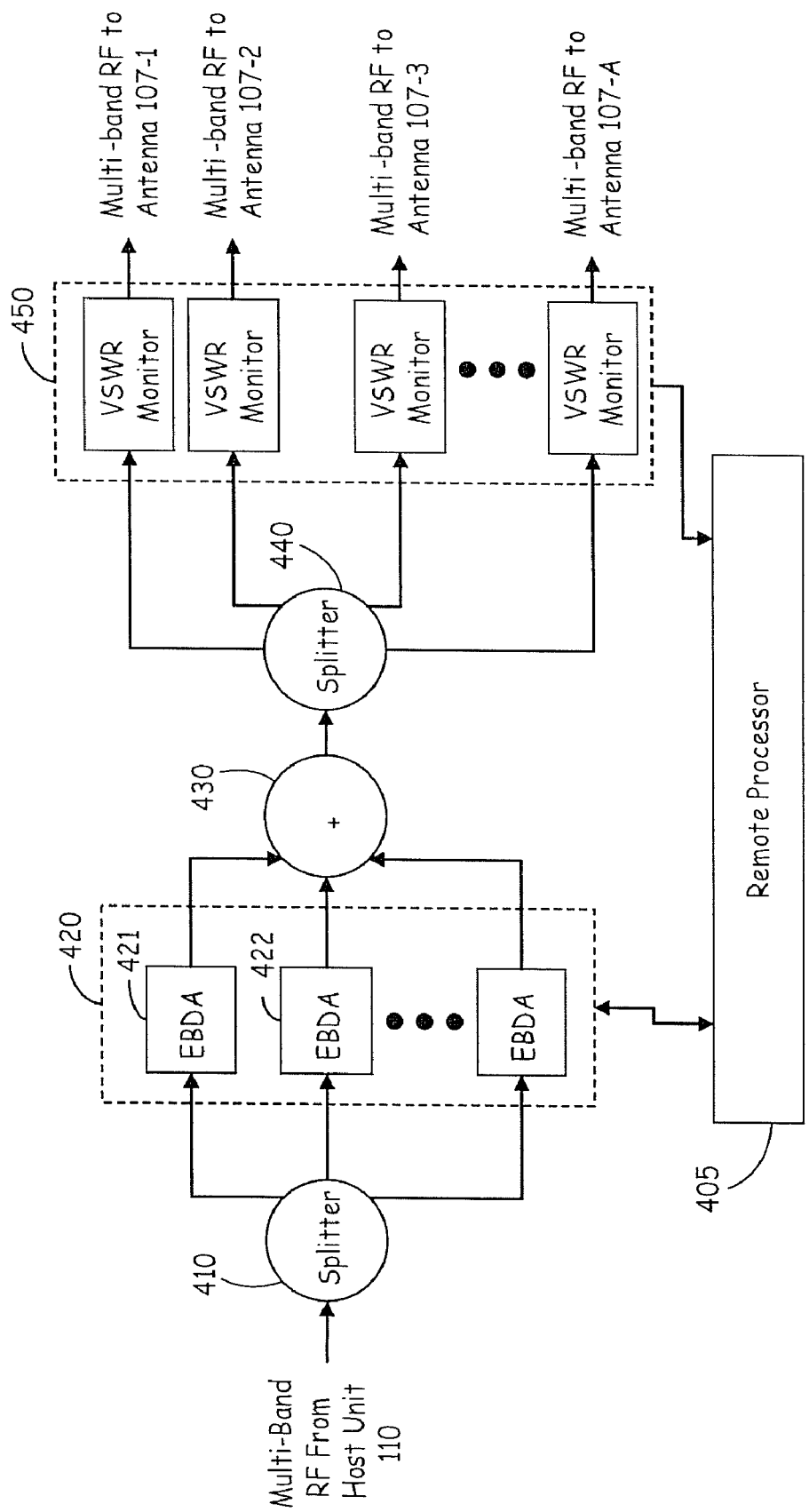
FIGS. 4A and 4B are diagrams illustrating a forward and reverse path, respectively, for a remote unit of one embodiment of the present invention.
Figure 4B:
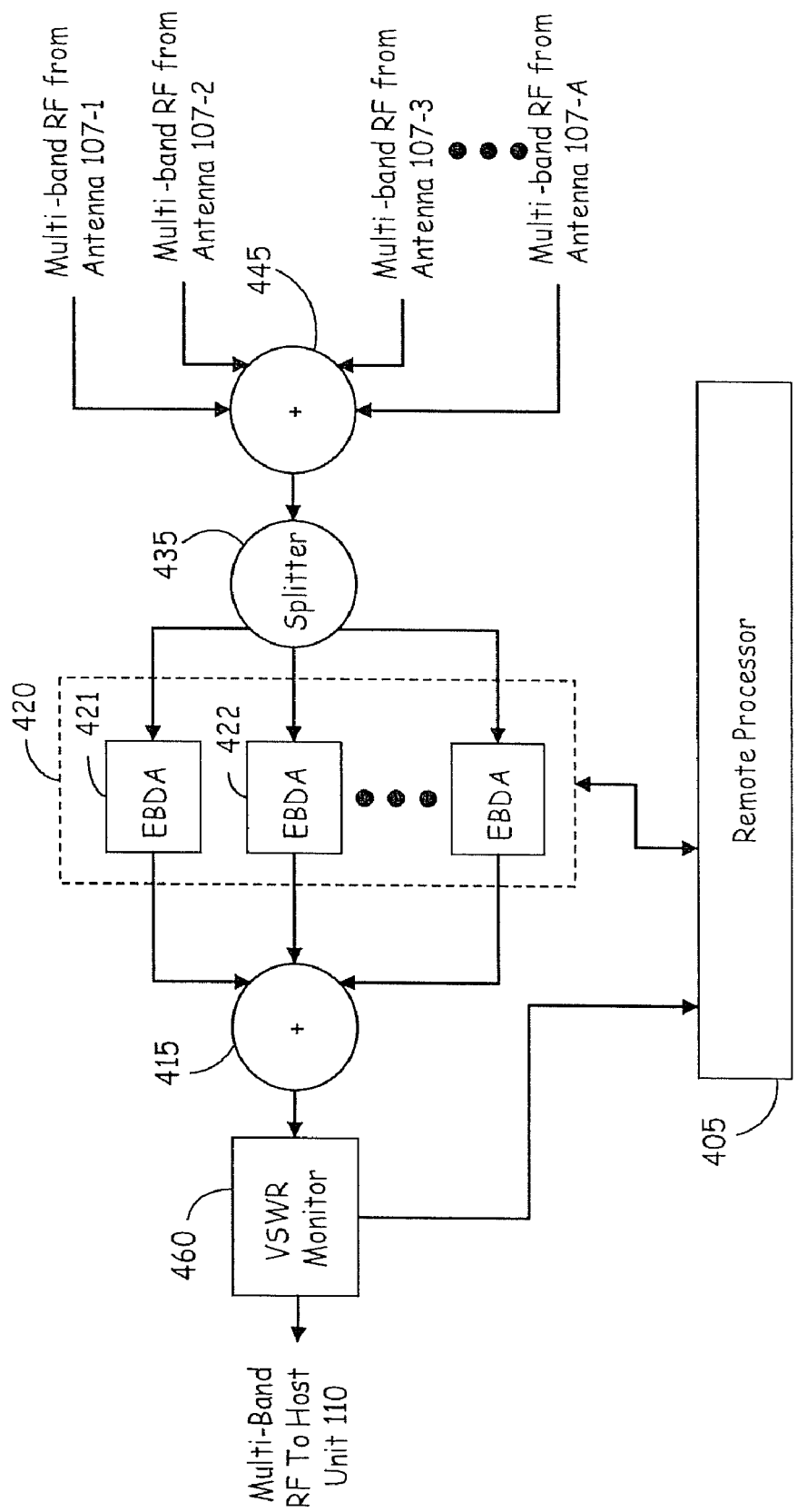

FIGS. 4A and 4B are block diagrams illustrating the flow of voice/data information through the analog RF transport of remote unit 105-1 in the forward and reverse path respectively. In one embodiment, remote units 105-2 to 105-N each include the same functionalities described herein with respect to remote unit 105-1.

As illustrated in FIG. 4A, in operation in the forward path remote unit 105-1 receives the multi-band RF signal transmitted by host unit 110 via communications link 106-1. The multi-band RF signal is received at splitter 410 and forwarded to a plurality of EBDA modules 420 (discussed in greater detail below). In one embodiment, each EBDA module is associated with a specific RF frequency band and assigned to perform signal processing to RF signals within that RF frequency band. For example, in one embodiment, EBDA module 421 performs signal processing on RF signals within an 800-850 MHz frequency band, while EBDA module 422 performs signal processing on RF signals within a 1.0-1.5 GHz frequency band. In one embodiment, EBDA modules 420 separate their assigned specific RF frequency band from the multi-band RF signal. For example, in one embodiment, each of EBDA modules 420 filters out RF signals that are outside of their assigned RF frequency band. The resulting output of each of EBDA modules 420 is a processed single band RF signal. The output of the EBDA modules 420 is combined back into a multi-band RF signal by RF signal combiner 430. This multi-band RF signal is received at splitter 440 and provided to each of remote units 105-1's antennas 107-1 to 107-A for wireless transmission to mobile units 142.

FIG. 4B illustrates the operation of the reverse path of remote unit 105-1 of one embodiment of the present invention. Remote unit 105-1 receives a plurality of multi-band RF signals from antennas 107-1 to 107-A and combines the several multi-band RF signals into a single multi-band RF signal at combiner 445. The multi-band RF signal is received at splitter 435 and forwarded to the EBDA modules 420. As discussed above, each EBDA module is assigned to perform signal processing to RF signals within a specific RF frequency band. In one embodiment, EBDA modules 420 separate their assigned specific RF frequency band from the multi-band RF signal. The RF frequency band assigned to each EBDA module in the reverse path is not necessarily the same RF assigned to that EBDA module in the forward path. For example, in one embodiment, EBDA module 421 performs signal processing on RF signals in the reverse bath within an 900-950 MHz frequency band, while EBDA module 422 performs signal processing on RF signals in the reverse path within a 2.0-2.5 GHz frequency band. The output of the EBDA modules 420 is combined back into a multi-band RF signal by RF signal combiner 415. Remote unit 105-1 transmits this multi-band RF signal output to host unit 110 via communications links 125.

Because forward and reverse path RF signals can be simultaneously transported as analog signals on the same physical transport, in one embodiment, splitter 440 and combiner 445 may be incorporated into the same physical device that splits forward path RF signals as described above and combines reverse RF path signals as described above. Similarly, in one embodiment, splitter 410 and combiner 415 may be incorporated into the same physical device that splits forward path RF signals and combines reverse RF path signals. In the same way, combiner 430 and splitter 435 may be incorporated into the same physical device that combines forward path RF signals as described above and splits reverse RF path signals as described above.

Figure 5:
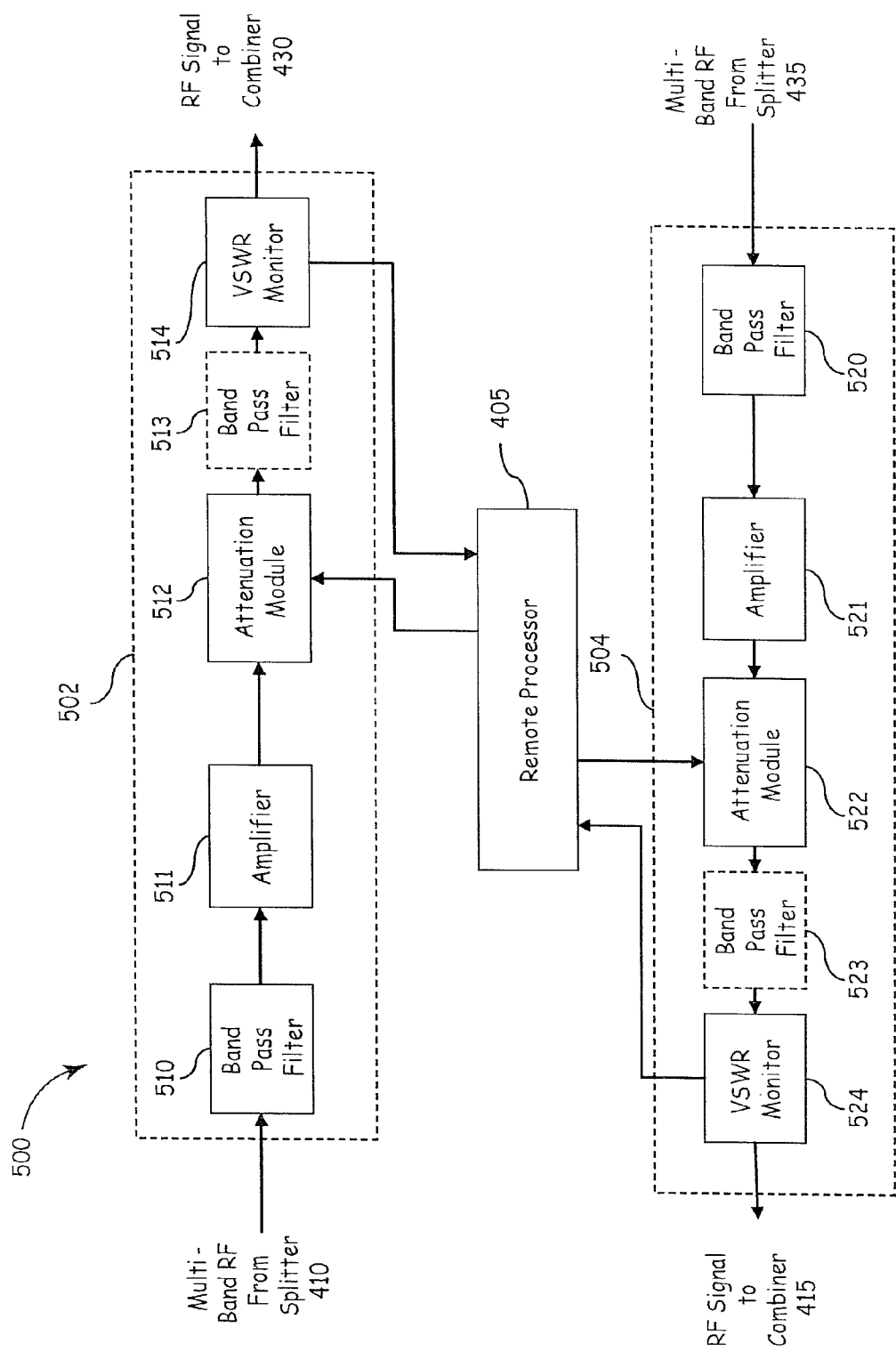
FIG. 5 is a block diagram illustrating a remote unit enhanced bidirectional amplifier of one embodiment of the present invention.

FIG. 5 is a block diagram illustrating a remote unit EBDA module 500, such as EBDA modules 420 discussed with respect to FIG. 4. EBDA module 500 provides amplification of RF signals in both the forward and reverse path, and performs several signal processing functions to RF signals in both the forward and reverse path. These signal processing functions include, but are not limited to signal attenuation control, input drive level adjustment, footprint adjustment (to adjust the coverage area within the building), dynamic adjustment of gain based on coaxial cable losses, dynamic monitoring and management of signal levels to prevent overdriving of electronics. In addition, EBDA module 500 performs monitoring and control functions, such as RF signal power monitoring and software driven shutdown of an individual RF frequency band. EBDA module 500 includes forward path functions 502 and reverse path functions 504.

In the forward path, EBDA module 500 includes a band pass filter 510, an amplifier 511, a variable RF signal attenuation module 512, and a voltage standing wave ratio (VSWR) monitor 514. In operation in one embodiment, EBDA module 500 receives a multi-band RF signal from splitter 410 and band pass filer 410 filters out RF signals outside the RF frequency band assigned to EBDA module 500. Amplifier 511 provides amplification to the filtered RF signal. Attenuation module 512 receives the filtered RF signal and attenuates the RF signal based on instructions received from host processor 505. VSWR monitor 514 measures the signal power of the RF signal output from attenuation module 512. In one embodiment, the RF signal is then provided to combiner 430. In one embodiment, an optional band pass filter 513 filters from the forward path RF signal any RF noise outside the RF frequency band assigned to EBDA module 500, which may have been introduced by EBDA module 500.

Based on VSWR monitor power measurements, a remote processor 405 coupled to EBDA modules 420 can dynamically determine the RF signal power output from each of EBDA modules 420. Measuring the power output of each of EBDA modules 420, enables remote processor 405 to identify forward path power fluctuations and anomalies within specific RF frequency bands. Further, variable attenuators (such as attenuation module 512) within each of EBDA modules 420 enables remote processor 405 to adjust the signal power within a specific RF frequency band without necessarily altering the power levels of RF signals outside of that RF frequency band. In addition, host processor can shut down further processing of RF signals within any specific RF frequency band by adjusting the corresponding variable attenuators (such as attenuation module 512) to provide a zero power level output.

In the reverse path, EBDA module 500 includes a band pass filter 520, an amplifier 521, a variable RF signal attenuation module 522, and a voltage standing wave ratio (VSWR) monitor 524. In operation in one embodiment, EBDA module 500 receives a reverse path multi-band RF signal from splitter 435 and band pass filer 529 filters out RF signals outside the reverse path RF frequency band assigned to EBDA module 500. Amplifier 521 provides amplification to the filtered RF signal to ensure the RF signal power is adequate for transport to the host unit. Attenuation module 522 receives the filtered RF signal and attenuates the RF signal based on instructions received from remote processor 405. VSWR monitor 524 measures the signal power of the RF signal output from attenuation module 512. In one embodiment, the RF signal is then provided to combiner 415. In one embodiment, an optional band pass filter 523 filters from the forward path RF signal any RF noise outside the RF frequency band assigned to EBDA module 500, which may have been introduced by EBDA module 500.

Based on the VSWR monitor power measurements, remote processor 405 dynamically determines the RF signal power output from each of EBDA modules 420. Measuring the power output of each of EBDA modules 420, enables host processor 205 to identify power fluctuations and anomalies within specific RF frequency bands. Further, control of variable attenuators (such as attenuation module 522) within each of EBDA modules 420 enables remote processor 405 to adjust the signal power within a specific RF frequency band without necessarily altering the power levels of RF signals outside of that RF frequency band. In addition, host processor can shut down further processing of RF signals within any specific reverse path RF frequency band by adjusting variable attenuators (such as attenuation module 522) to provide a zero power level output.

In addition to having VSWR modules located within each of EBDA modules 420, in one embodiment, remote unit 105-1 includes VSWR modules 450 and 460. VSWR modules 450 monitor the power level of the multi-band RF signal output from remote unit 105-1 to each of antennas 107-1 to 107-A. VSWR modules 450 thus enable remote processor 405 to dynamically monitor the forward path power level of RF signals transmitted by each of antennas 107-1 to 107-A. VSWR module 460 monitors the power level of the multi-band RF signal output from remote unit 105-1 to host unit 110, enabling remote processor 405 to dynamically monitor the reverse path power level to host unit 110.

In one embodiment, host unit 110 and remote units 105-1 to 105-N communicate system status and configuration information with each other using messages. These messages include, but are not limited to, configuration messages, alarm messages and status messages. For example, in one embodiment host unit 110 communicates one or more configurations messages to remote unit 105-1 in order to set or modify one or more of remote unit 105-1's operational parameters, such as, but not limited to, the forward and reverse RF signal attenuation provided by one or more of EBDA modules 420. In one embodiment, remote unit 105-1 communicates one or more status messages to host unit 110 such as, but not limited to, RF signal power levels, the operating configuration of EBDA modules (for example, current attenuation levels provided by the EBDA modules), and system heath status messages. In one embodiment, remote unit 105-1 communicates one or more alarm messages to host unit 110 when an anomaly or other monitored event is discovered. For example, in one embodiment, when a VSWR monitor (such as VSWR monitors 514, 450 and 460) measure an unexpected drop in forward or reverse path signal levels, remote unit 105-1 communicates an alarm message to host unit 110.

Figure 6:
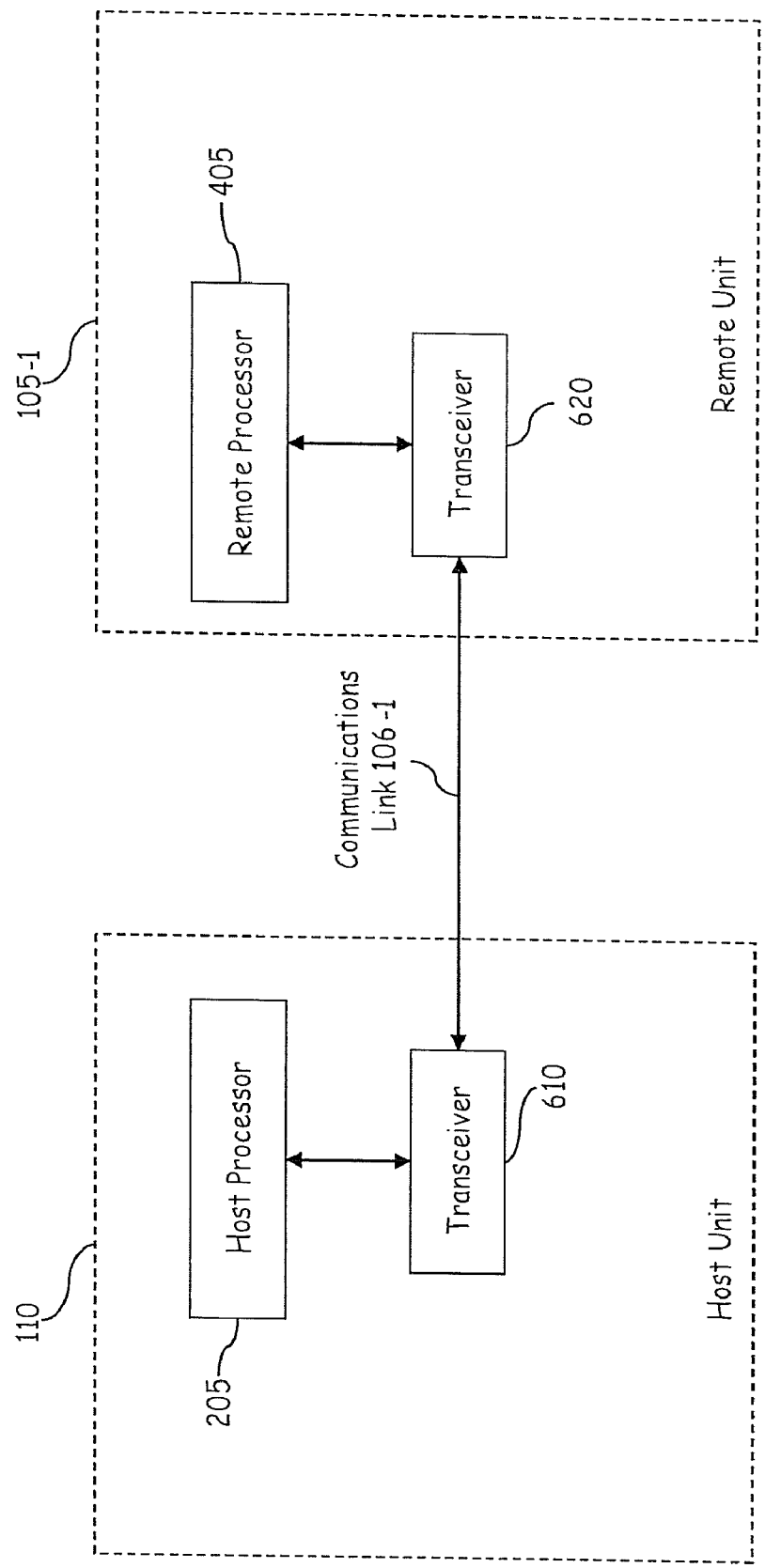
FIG. 6 is a block diagram illustrating messaging between a host unit and remote unit of one embodiment of the present invention.

As illustrated in FIG. 6, to enable configuration, alarm, and status message communications between host processor 205 and remote processor 405, in one embodiment, host processor 205 is coupled to a transceiver 610 which transmits forward path digital messages generated by host processor 205 to remote unit 105-1 via the same communications link 106-1 used to communicate the forward path multi-band RF signal to remote unit 105-1. Transceiver 610 further receives reverse path digital messages via communications link 106-1 from remote unit 105-1 and forwards those messages to the host processor 205. At remote unit 105-1, remote processor 405 is coupled to transceiver 620. Transceiver 620 receives the digital messages transmitted by host unit 110 via communications link 106-1. Remote processor 405 communicates configuration, alarm, status and other information to the host processor 205 by sending digital messages to transceiver 620, which transmits reverse path digital messages to the transceiver 610 via communications link 106-1.

To transmit digital messages on the analog transport provided by communications link 106-1, host unit transceiver 610 receives the digital messages from host processor 205 and converts the messages into an analog RF communication signal. At the receiving end, remote unit transceiver 620 receives the analog RF communication signal, extracts the digital message from host processor 205, and forwards the message to remote processor 405. Similarly, remote unit transceiver 620 receives digital messages from remote processor 405 and converts the digital messages into an analog RF communication signal for transport via communications link 106-1. At the receiving end, host unit transceiver 610 received the analog RF communication signal, extracts the digital message from remote processor 405, and forwards the message to host processor 205.

As an example, in one embodiment, remote processor 405 receives power level information from a VWSR monitor, such as VSWR monitor 514 for example. When remote processor 405 receives anomalous signal power information from VWSR monitor 514, remote processor 405 generates a digital alarm message, which is modulated by transceiver 620 as an analog RF signal onto communications link 106-1. Transceiver 610 receives the RF signal and demodulates the analog RF signal to retrieve the digital alarm message generated by remote processor 405. Host processor 205 then receives the digital alarm message from transceiver 610.

In one embodiment, when converting digital messages into analog RF communication signals, transceivers 610 and 620 modulate the digital messages onto a messaging frequency within the transport window of communications link 106-1. The transport window of communications link 106-1 includes those range of frequencies that communications link 106-1 is required to carry in order to effectively transport RF frequency bands associated with the various service providers. In one embodiment, transceivers 610 and 620 modulate the digital messages within the transport window of communications link 106-1 based on a messaging frequency between 750 megahertz and 2200 megahertz, inclusive.

In one embodiment, system 100 utilizes band specific automatic gain control. Band specific automatic gain control measures RF signal power losses (also known as "path losses") due to a physical transport medium (such as optical fiber or coax cable, for example) used to implement communications links 106-1 to 106-N. As would be appreciated by one skilled in the art upon reading this specification, the magnitude of path loss experienced by and RF signal due to a physical transport medium is at least partially a function of the RF signal frequency. In other words, RF signals traveling in different RF frequency bands will experience different levels of path loss when transmitted on otherwise identical physical transport medium. Band specific automatic gain control dynamically estimates RF signal path losses experienced within the specific RF frequency bands assigned EBDA modules and readjusts forward and reverse path attenuation levels provided by the EBDA modules to compensate for path losses.

Figure 7A:
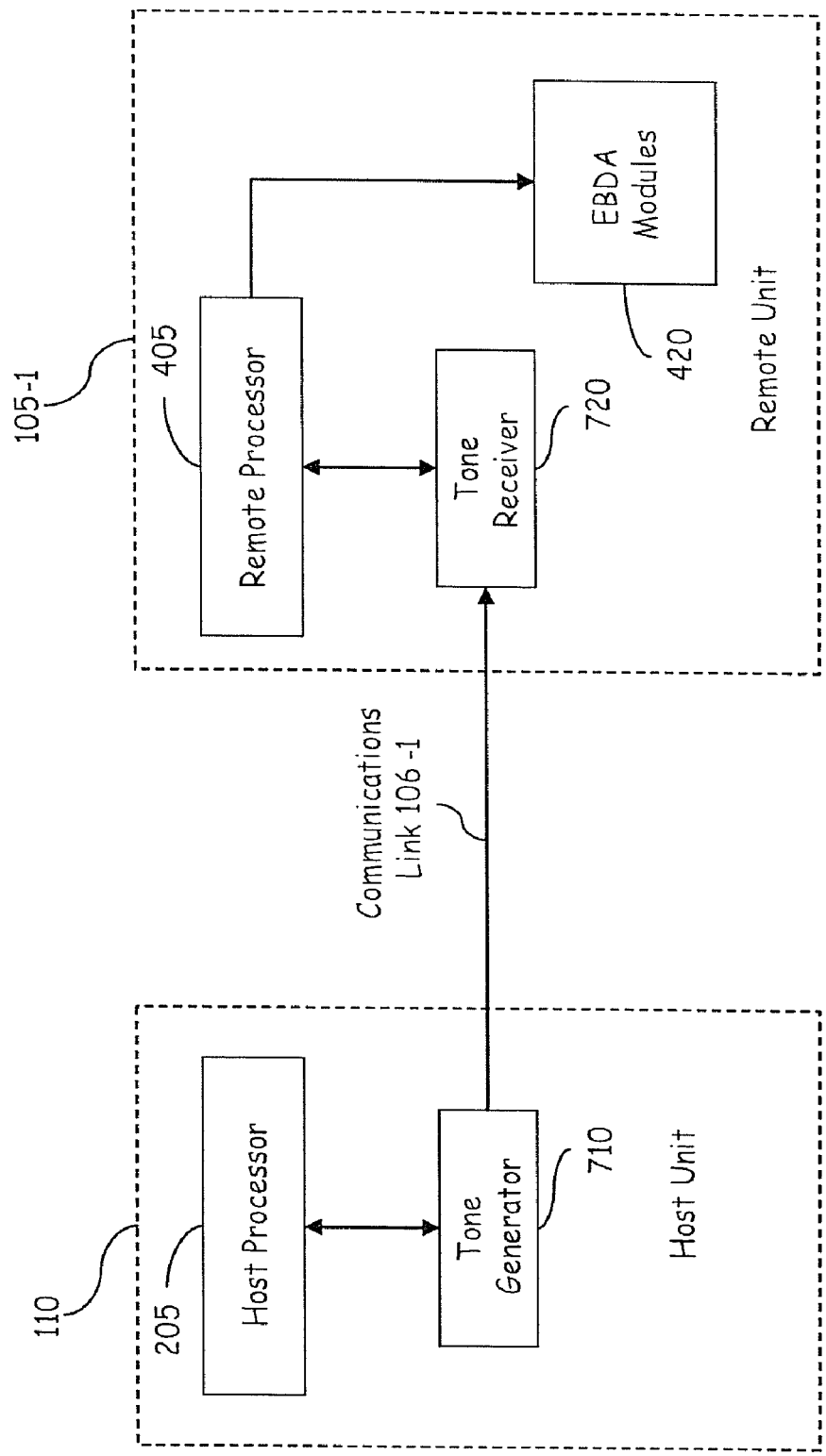
FIG. 7A is a block diagram illustrating band specific automatic gain control of one embodiment of the present invention.

FIG. 7A is a block diagram illustrating the implementation of band specific automatic gain control between host unit 110 and remote unit 105-1 of one embodiment of the present invention. In other embodiments, automatic gain control between host unit 110 and one or more of remote units 105-1 to 105-N is implemented as described with respect to FIG. 7A. In one embodiment, host unit 110 further includes a tone generator 710 for transmitting a plurality of pilot tones onto communications link 106-1. Remote unit 105-1 further includes a tone receiver 720 for receiving the pilot tones and measuring the signal power of the pilot tones. The difference power level between when a pilot tone was transmitted by tone generator 710 and received by tone receiver 720 is a function of the path loss of communications link 106-N at that pilot tone's frequency. In one embodiment, remote processor 405 dynamically monitors the power level of the pilot tones received by tone receiver 720 and calculates the path losses of communications link 106-1 for each pilot tone.

Figure 7B:
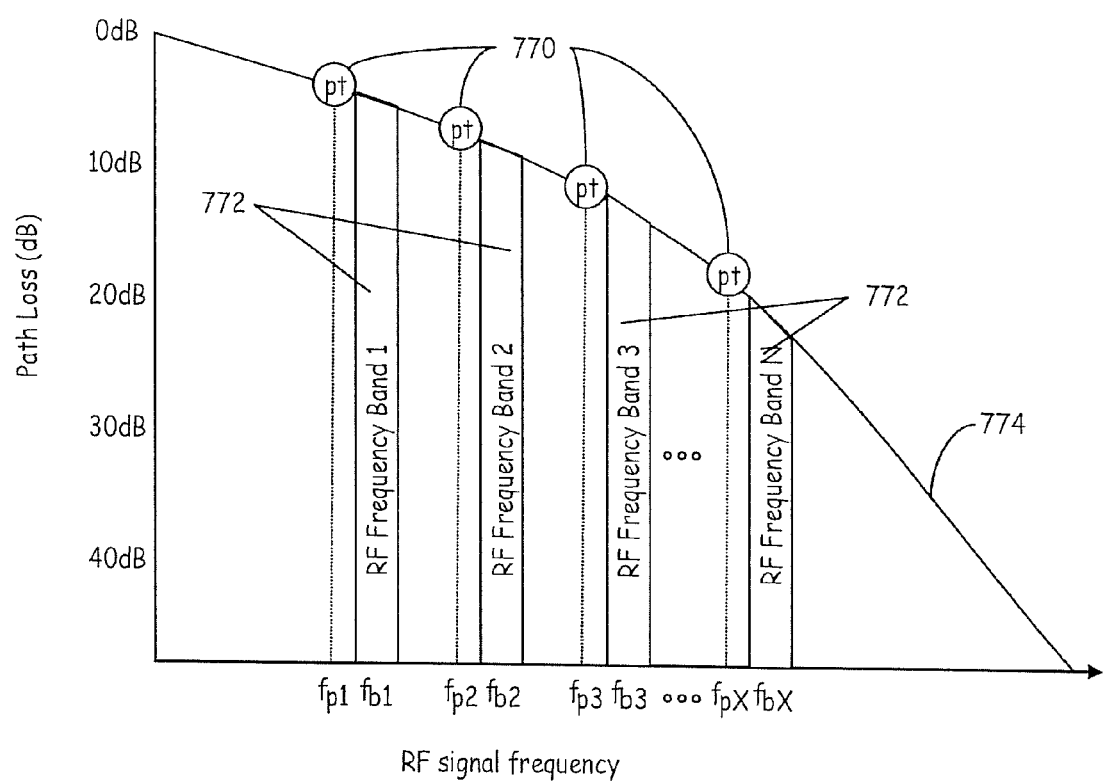
FIG. 7B is a graph generally illustrating band specific automatic gain control for an electrical cable of one embodiment of the present invention.

FIG. 7B is a graph generally illustrating a path loss versus frequency relationship for an embodiment where an electrical cable is used to implement communications link 106-1. In the embodiment illustrated in FIG. 7B, the tone generator 710 generates one pilot tone for each of the EBDA modules 220, at a known signal power level and a frequency close to the RF frequency bands assigned to each of the EBDA modules. However, in other embodiments, any number of two or more pilot tones may be used to estimate a frequency versus path loss relationship for a communications link.

Using the path losses calculated for each of the pilot tones (pt) (shown generally at 770, where $f_{p1}$ to $f_{pX}$ are the RF frequencies of the X number of pilot tones), remote processor 405 estimates the path losses affecting each of the multiple RF frequency bands (shown generally at 772, where $f_{b1}$ to $f_{bX}$ are the center frequencies of the X number of RF frequency bands) carried by communications medium 106. In one embodiment, remote processor 405 calculates a best fit curve equation (illustrated by curve 774) of path loss as a function of RF frequency based on the calculated pilot tones losses. In that case, remote processor 405 calculates an expected RF path loss for each of the RF frequency bands 772 using the best fit curve equation. In one equation, remote processor 405 saves the calculated pilot tone path loss data in a table (not shown) and interpolates an expected RF power loss for each of the RF frequency bands 772 from the table.

Based on the expected RF power losses for each of the RF frequency bands 772, remote processor 405 adjusts the forward and reverse path attenuation provided by each of the EBDA modules 420 to compensate for the calculated path losses. In this way, system 100 can estimate the path losses experienced within multiple RF frequency bands and individually adjust the attenuation provided at those RF band frequencies.

Figure 7C:
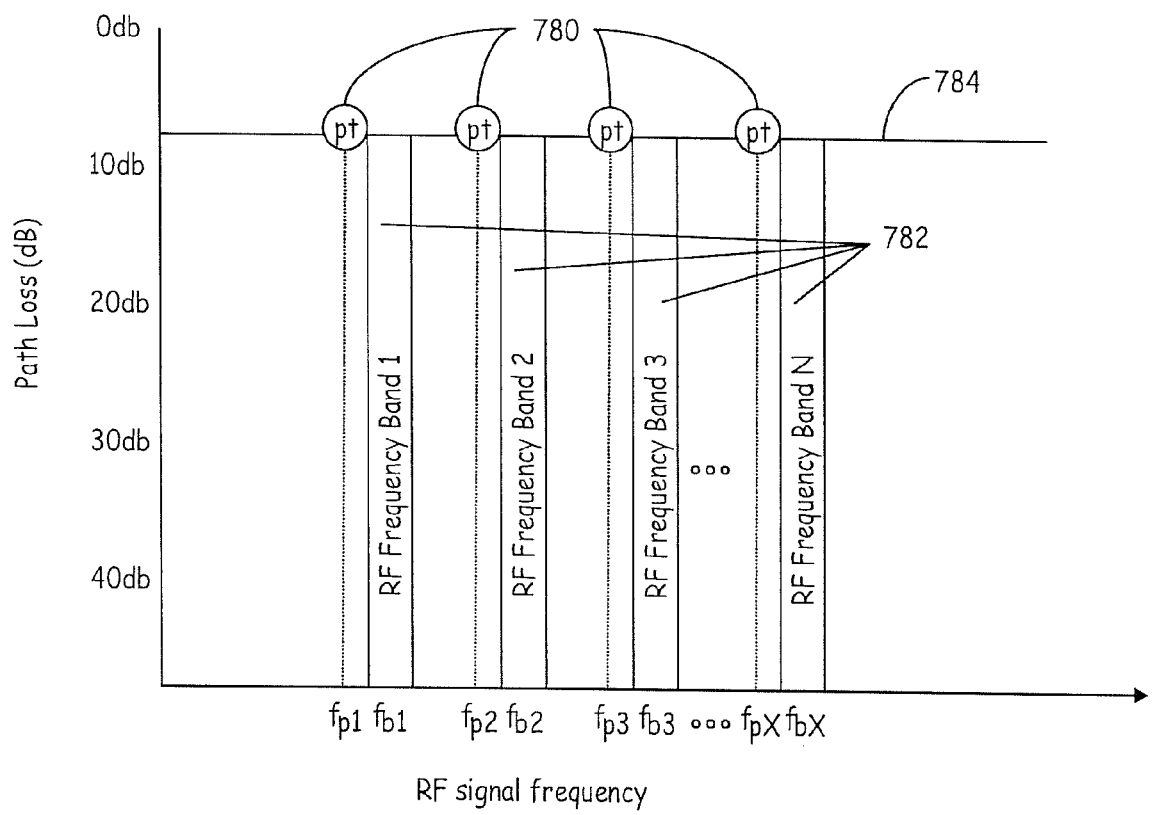
FIG. 7C is a graph generally illustrating band specific automatic gain control for an optical cable of one embodiment of the present invention.

Band specific automatic gain control is not limited to implementations where an electrical cable is used for communications link 106-1, but is also applicable to fiber optic applications. FIG. 7C is a graph generally illustrating a path loss versus frequency relationship for an embodiment where an optical cable is used to implement communications link 106-1. Using the path losses calculated for each of the pilot tones (pt) (shown generally at 780, where $f_{p1}$ to $f_{pX}$ are the RF frequencies of the X number of pilot tones), remote processor 405 estimates the path losses affecting each of the multiple RF frequency bands (shown generally at 782, where $f_{b1}$ to $f_{bX}$ are the center frequencies of the X number of RF frequency bands) carried by communications medium 106. In one embodiment, remote processor 405 calculates a best fit curve equation (illustrated by curve 784) of path loss as a function of RF frequency based on the calculated pilot tones losses. In that case, remote processor 405 calculates an expected RF path loss for each of the RF frequency bands 782 using the best fit curve equation. In one equation, remote processor 405 saves the calculated pilot tone path loss data in a table (not shown) and interpolates an expected RF power loss for each of the RF frequency bands 782 from the table. Based on the expected RF power losses for each of the RF frequency bands 782, remote processor 405 adjusts the forward and reverse path attenuation provided by each of the EBDA modules 420 to compensate for the calculated path losses. In this way, system 100 can estimate the path losses experienced within multiple RF frequency bands and individually adjust the attenuation provided at those RF band frequencies.

As illustrated by curve 774 in FIG. 7B, electrical cable path losses are expected to increase for increasing RF signal frequencies. In contrast, curve 784 in FIG. 7C shows that optical cable path losses are expected to be constant across the transport window. One advantage of the band specific automatic gain control provided by embodiments of the present invention is that it enables a remote unit to dynamically adjust RF signal power levels to compensate for the path loss whether optical fiber or electrical cable is used for communications link 106-1.

In one embodiment, system 100 utilizes automatic limit control (ALC) to prevent output signals generated by one or both of host unit 110 and remote units 105-1 to 105-N from exceeding predefined output power limits. Referring back to EBDA module 300 illustrated in FIG. 3, in one embodiment in the forward path, when the output power measured by VSWR monitor 314 exceeds a pre-determined threshold setpoint, host processor 205 signals attenuation module 312 to increase the attenuation of the forward path RF signal so that the output does not increase any further. When the output of an EBDA module is less than the pre-determined threshold setpoint, host processor 205 allows forward path output to continue without the additional attenuation. For the reverse path, when the output power measured by VSWR monitor 324 exceeds a pre-determined threshold setpoint, host processor 205 signals attenuation module 322 to increase the attenuation of the reverse path RF signal so that the output does not increase any further. When the output of an EBDA module is less than the pre-determined threshold setpoint, host processor 205 allows the reverse path output to continue without the additional attenuation.

Referring back to the EBDA module 500 illustrated in FIG. 5, in one embodiment in the forward path, when the output power measured by VSWR monitor 514 exceeds a pre-determined threshold setpoint, remote processor 405 signals attenuation module 512 to increase the attenuation of the forward path RF signal so that the output does not increase any further. When the output of an EBDA module is less than the pre-determined threshold setpoint, remote processor 405 allows forward path output to continue without the additional attenuation. For the reverse path, when the output power measured by VSWR monitor 524 exceeds a pre-determined threshold setpoint, host processor 405 signals attenuation module 522 to increase the attenuation of the reverse path RF signal so that the output does not increase any further. When the output of an EBDA module is less than the pre-determined threshold setpoint, host processor 405 allows the reverse path output to continue without the additional attenuation.

A remote unit's forward and reverse direction footprints determine how close a mobile unit 142 must be to a remote unit in order to communicate with system 100. The forward direction footprint is a function of the signal power (i.e., the gain) of the RF signal transmitted by a remote unit's antennas. In one embodiment, a remote unit's forward direction footprint (such as remote unit 150-1 for example), is controlled by a manual adjustment to the forward path RF signal gain provided by EBDA modules 420. In one embodiment, the manual adjustment is software controlled. For example, in one embodiment remote processor 405 varies the forward path gain provided by EBDA module 500 by varying the attenuation provided by attenuation module 512. In one embodiment, remote processor 405 receives one or more configuration messages from host unit 110, and adjusts the gain provided by each of EBDA modules 420 to achieve the desired forward direction footprint based on the one or more configuration messages.

The reverse direction footprint is a function of a remote unit's sensitivity for receiving RF signals transmitter by a mobile unit 142. In one embodiment, a remote unit's sensitivity to RF signals (i.e., the reverse direction footprint) is controlled by a manual adjustment to the reverse path RF signal gain provided by EBDA modules 420. In one embodiment, the manual adjustment is software controlled. For example, in one embodiment remote processor 405 varies the gain provided by EBDA module 500 by varying the attenuation provided by attenuation module 522. In one embodiment, remote processor 405 receives one or more configuration messages from host unit 110, and adjusts the gain provided by each of EBDA modules 420 to achieve the desired reverse direction footprint based on the one or more configuration messages.

Figure 8:
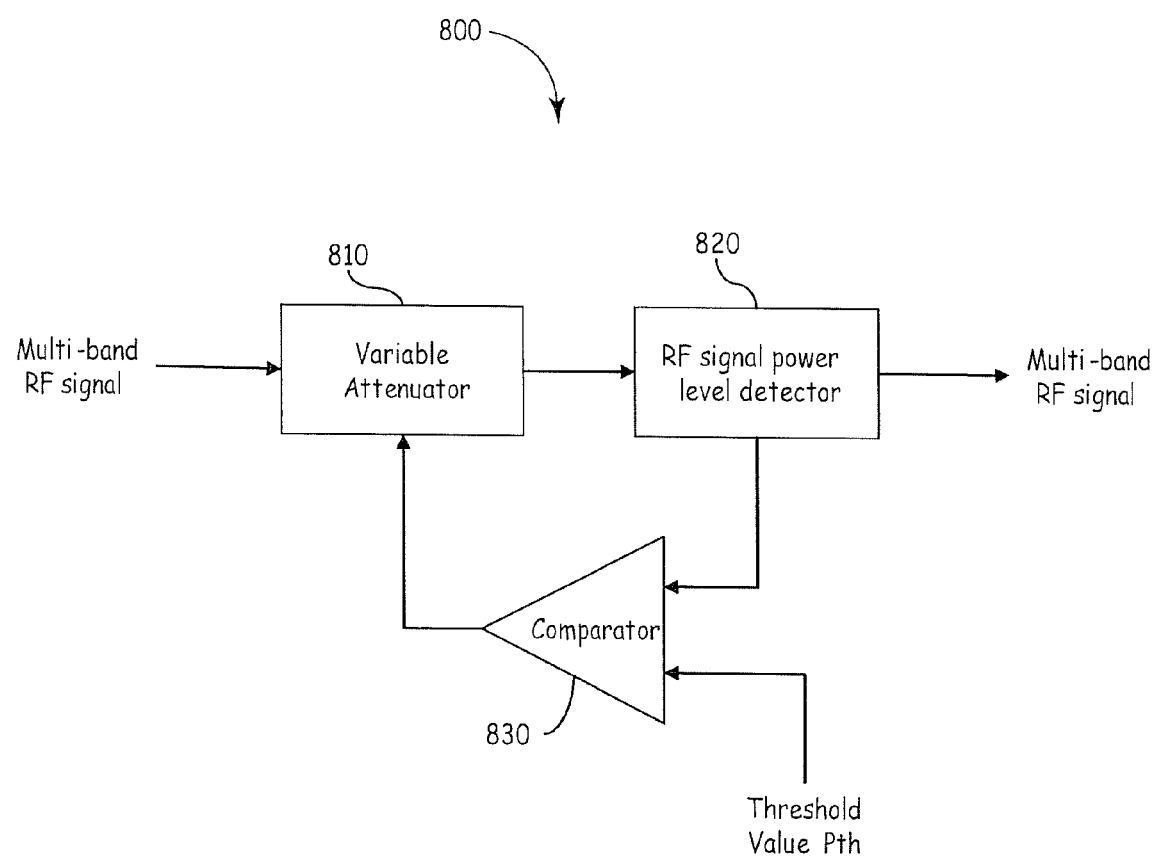
FIG. 8 is a block diagram illustrating a limiter of one embodiment of the present invention.

To protect electronics within system 100 from being overdriven by external RF signals received by either host unit 110 or remote units 105-1 to 105-N, system 100 utilizes limiters to reduce the power of any received RF signal based on a threshold value. In one embodiment, incoming RF signals received with power levels less than the threshold value are passed without modification. In one embodiment, RF signals received that exceed the threshold value are limited to the threshold value before further processing by host unit 110 or remote units 105-1 to 105-N. In one embodiment, limiters in system 100 are realized by employing feedback based limiting circuits as illustrated in FIG. 8. Limiter 800 comprises a variable attenuator 810, an RF signal power level detector 820, and a comparator 830. In one embodiment, limiter 800 operates as a hard limiter. In such an embodiment, in operation, when comparator 830 determines that the RF signal power detected by RF signal power level detector 820 is equal to the threshold value (Pth), variable attenuator 810 prevents the RF signal power from further increasing beyond Pth. In one embodiment, to implement hard limiting, limiter 800 has a closed loop gain such that the magnitude of additional RF power attenuation provided by variable attenuator 810 will exceed the magnitude of any RF power increase in the incoming signal, when the RF power of the incoming signal is greater than Pth. In other embodiments limiter 800 operates as a soft limiter in which the transfer function of limiter 800 is a function of its instantaneous or integrated output level. In such an embodiment, the output waveform of limiter 800 is a distorted representation of the multiband RF signal input, but not a clipped representation.

In one embodiment, remote units 105-1 to 105-N include a limiter, such as limiter 800, to limit the RF signal power of wireless RF signals received via the remote unit's antennas. In one embodiment, host unit 110 includes a limiter, such as limiter 800, to limit the signal power of RF signals received, for example, from a base station.

In one embodiment, the threshold value Pth is software controlled by either host computer 205 or remote computer 405. In one embodiment, remote computer 405 receives one or more configuration messages from host computer 205 and adjusts a threshold value Pth based on the one or more configuration messages.

Figure 9:
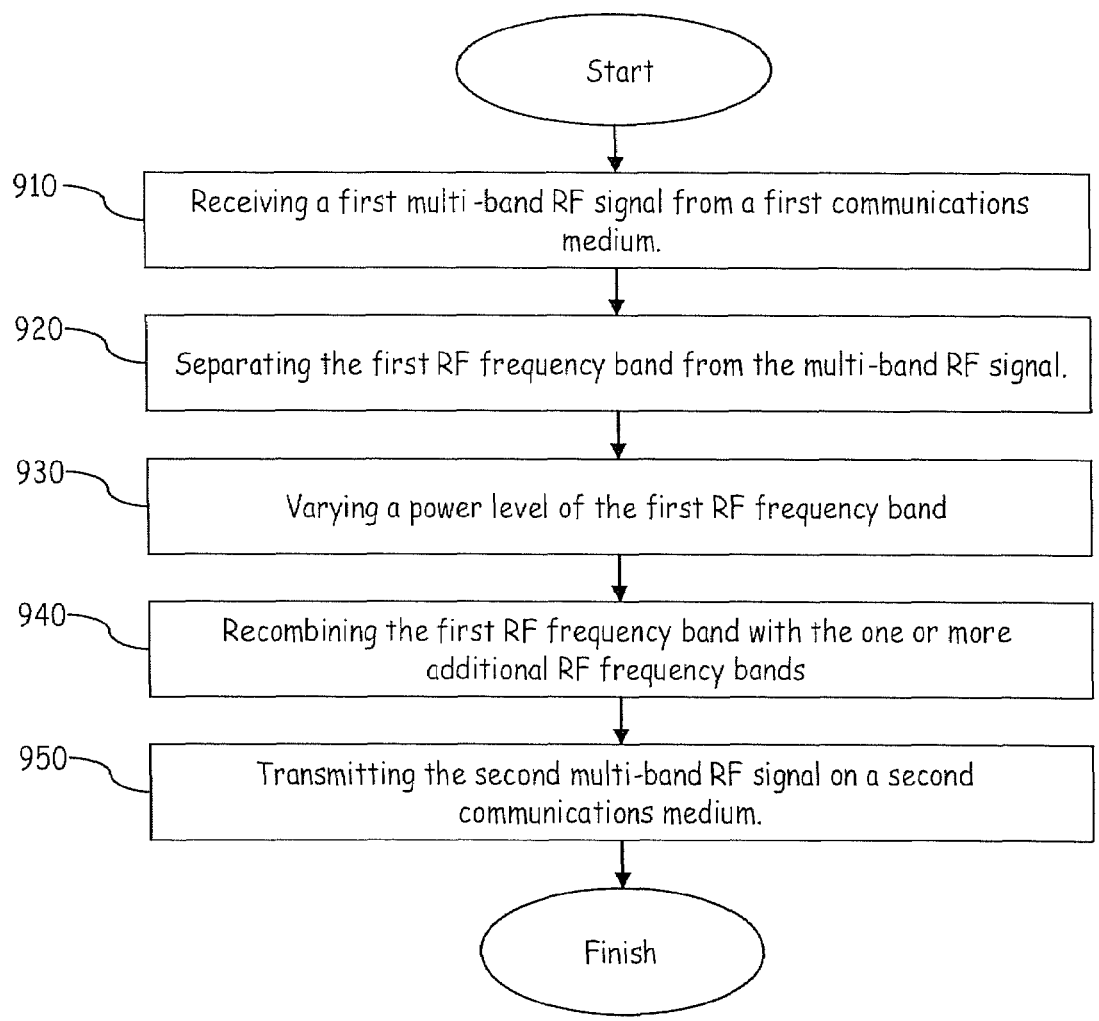
FIG. 9 is a flow chart illustrating a method of one embodiment of the present invention.

FIG. 9 is a flow chart illustrating a method for transporting analog multi-band RF signals of one embodiment of the present invention. The method begins at 910 with receiving a first multi-band RF signal from a first communications medium. In one embodiment, where the method is implemented in a host unit, such as host unit 110 described above, the first multiband RF signal comprises a plurality of forward path RF signals received from one or more service providers. In another embodiment where the method is implemented by a host unit, the first multiband RF signal comprises reverse path RF signals received from one or more remote units. In an alternate embodiment, where the method is implemented in a remote unit, such as remote unit 105-1 described above, the first multiband RF signal comprises a forward path multiband RF signal received from a host unit, such as host unit 110. In another embodiment, where the method is implemented in a remote unit, the first multiband RF signal comprises reverse path RF signals received from one or more mobile units via one or more antenna. In one embodiment, to prevent overdriving electrical components within the host and/or remote units, the method optionally comprises limiting the power of the first multi-band RF signal based on a power threshold. In one embodiment, the limiting is performed by one or more hard limiters as described with respect to FIG. 8.

In one embodiment, the first multi-band RF signal includes a first RF frequency band and one or more additional RF frequency bands. The method proceeds to 920 with separating the first RF frequency band from the multi-band RF signal. Separating the first RF frequency band from the multi-band RF signal allows RF signals within the first RF frequency band to be adjusted independently, that is—without affecting RF signals outside of the first RF frequency band. The method proceeds to 930 with varying a power level of the first RF frequency band. In one embodiment the first RF frequency band is processed by an EBDA module as described above and the power level is adjusted by one or both of amplifying RF signals within the first RF frequency band and attenuating RF signals within the first RF frequency band. The method proceeds to 940 with recombining the first RF frequency band with the one or more additional RF frequency bands into a second multi-band RF signal. The method proceeds to 950 with transmitting the second multi-band RF signal on a second communications medium. The method of FIG. 9 illustrates independently adjusting signals of a first RF band within a multi-band RF signal. One of ordinary skill in the art upon reading this specification would appreciate that the method of FIG. 9 could be simultaneously applied to each of the RF bands comprising the multi-band RF signal to provide independent signal adjustments for each RF band.

In one embodiment, where the method is implemented with a host unit, the second multi-band RF signal is transmitted to one or more remote units. In another embodiment where the method is implemented with a host unit, the second multi-band RF signal is transmitted to the voice/data service providers. In one embodiment, transmitting the second multiband RF signal on a communications medium includes transmitting the second multi-band RF signal on one or both of optical fiber and wire cable. In one embodiment, where the method is implemented with a remote unit, the second multi-band RF signal is transmitted to one or more mobile units via one or more antenna. In another embodiment, where the method is implemented with a remote unit, the second multi-band RF signal is transmitted to a host unit.

Figure 10:
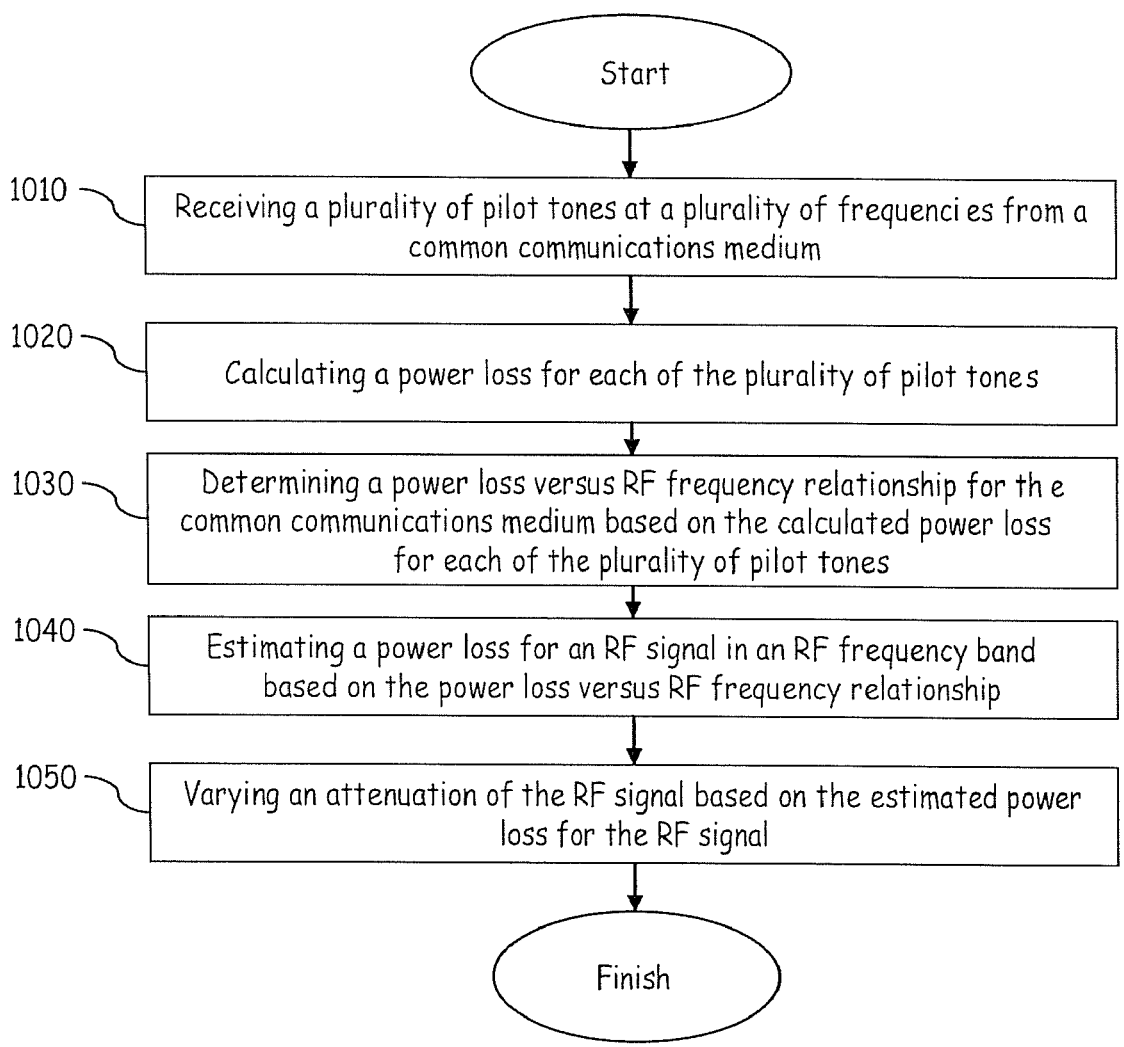
FIG. 10 is a flow chart illustrating a method for band specific automatic gain control of one embodiment of the present invention.

FIG. 10 is a flow chart illustrating a band specific automatic gain control method of one embodiment of the present invention. Band specific automatic gain control as implemented by this method measures RF signal path losses due to the physical transport medium used to implement a communications link between a host unit and a remote unit. As would be appreciated by one skilled in the art upon reading this specification, the magnitude of path loss experienced by and RF signal due to a physical transport medium is at least partially a function of the RF signal frequency. In other words, RF signals traveling in different RF frequency bands will experience different levels of path loss when transmitted on otherwise identical physical transport medium. Band specific automatic gain control dynamically estimates RF signal path losses experienced within the specific RF frequency bands assigned EBDA modules and readjusts forward and reverse path attenuation levels provided by the EBDA modules to compensate for path losses.

The method begins at 1010 with receiving a plurality of pilot tones at a plurality of frequencies from a common (i.e., the same) communications medium. In one embodiment, a tone generator at a host unit generates at least one pilot tone at a known signal power level at a frequency close to the RF frequency bands assigned to each of the EBDA modules in a remote unit. In other embodiments, any number of two or more pilot tones may be used. The method proceeds to 1020 with calculating a power loss for each of the plurality of pilot tones. The difference in power level between when a pilot tone was transmitted and received is a function of the path loss of the communications medium at that pilot tone's frequency. The method proceeds to 1030 with determining a power loss versus RF frequency relationship for the common communications medium based on the calculated power loss for each of the plurality of pilot tones. In one embodiment determining a power loss versus RF frequency relationship comprises calculating a best fit curve equation from the power losses calculated for each of the plurality of pilot tones. The method proceeds to 1040 with estimating a power loss for an RF signal in an RF frequency band based on the power loss versus RF frequency relationship.

The method proceeds to 1050 with varying an attenuation of the RF signal based on the estimated power loss for the RF signal. In one embodiment, using the estimated power loss for an RF signal within an RF frequency band, the method includes varying one or both of forward and reverse path RF signal power levels.

Figure 11:
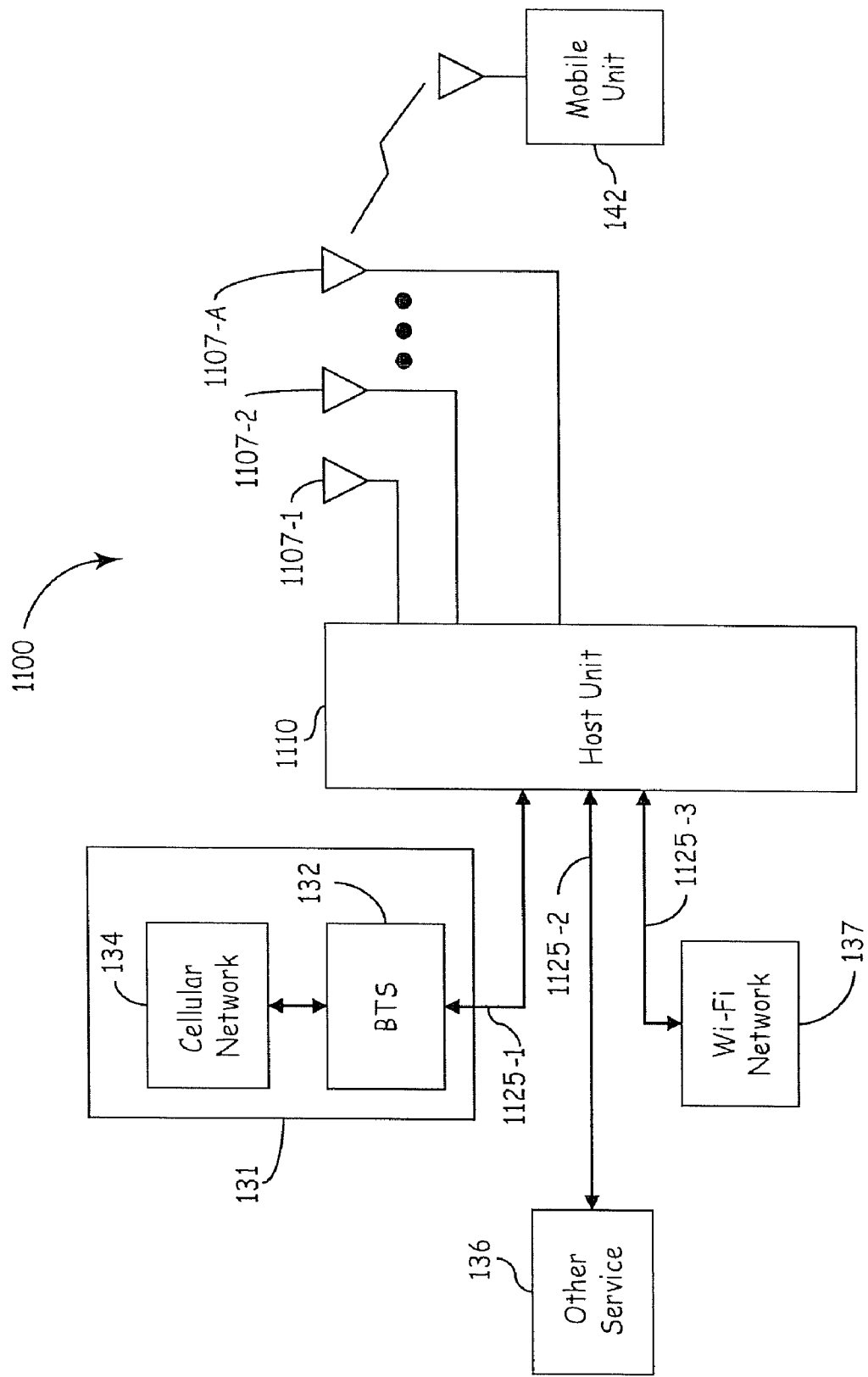
FIG. 11 is a block diagram illustrating a communication system 1100 of one embodiment of the present invention.

FIG. 11 is a block diagram illustrating a communication system 1100 of one embodiment of the present invention. System 1100 comprises a host unit 1110 that communicates with one or more service providers via one or more radio frequency (RF) signal communication links. In one embodiment, the RF signal communication links are implemented using a physical communications medium such as, but not limited to, coaxial cables, twisted pair wires and optical cables. In one embodiment, the communications links to the one or more service providers are implemented using wireless RF communications links. In some embodiments, the communications links include a combination of physical communications media and wireless RF communications links.

In one embodiment, the service providers include at least one cellular communications service provider 131. In such an embodiment, host unit 1110 is coupled to upstream base station 132 (BTS) which in turn is coupled to cellular communications network 134. Host unit 1110 is coupled to BTS 132 via communications link 1125-1. In alternate embodiments, communications link 1125-1 comprises physical communications media, wireless RF communications links, or a combination thereof. BTS 132 includes all the functionality required to format voice/data signals received from cellular communications network 134 for transport as RF signals to host unit 1110 via communications link 1125-1. BTS 132 also includes all the functionality required to format RF signals received from host unit 1110 into voice/data signals for transport on cellular communications network 134.

In one embodiment, the service providers include other services 136 such as, but not limited to paging services, local and wide area networks, audio and video programming, and broadband internet, coupled to host unit 1110 via communications link 1125-2. In alternate embodiments, communications link 1125-3 comprises one or more of a physical communications media, wireless RF communications links, or a combination thereof. In one embodiment, host unit 1110 is further coupled to a wireless network 137, such as but not limited to an IEEE 802.11 network, or an IEEE 802.16 network, via communications link 1125-3. In alternate embodiments, communications link 1125-3 comprises one or more of a physical communications media, wireless RF communications links, or a combination thereof. In such an embodiment, host unit 1110 communicates RF signals between the wireless network 137 and a mobile unit 142.

Host unit 1110 wirelessly transmits and receives voice/data information via RF signals with mobile units 142 via antennas 1107-1 to 1107-A, positioned at locations within a building or other facility. Voice/data signal to and from each of the service providers and mobile Units 142 is transported within assigned RF frequency bands and voice/data information traveling through system 1100 is processed using an analog radio frequency (RF) transport. Host unit 1110 operates as described with respect to host unit 110, except that host unit 1110 communicates with mobile units 142 directly, rather than via remote units.

Figure 12A:
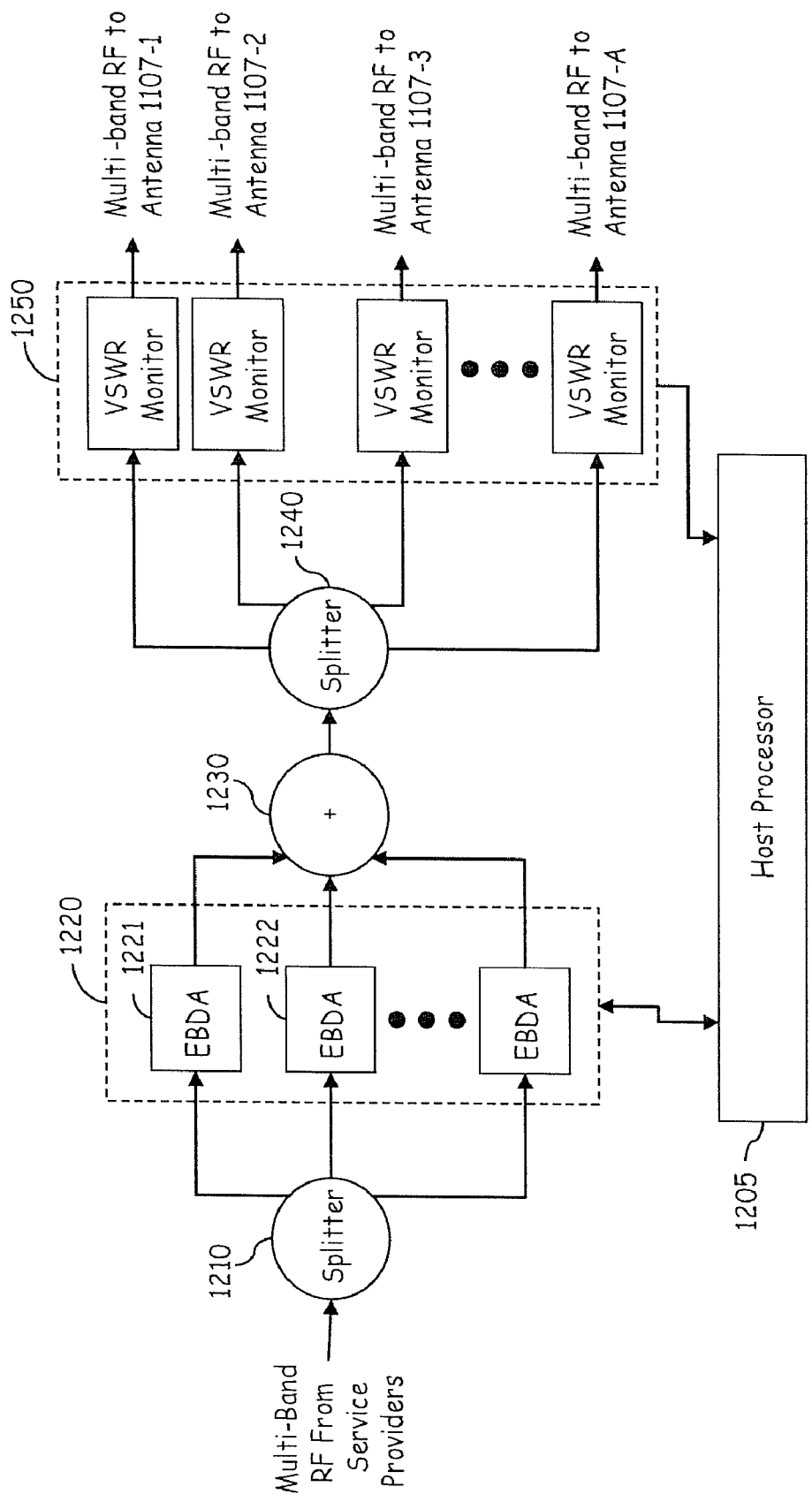
FIGS. 12A and 12B are diagrams illustrating a forward and reverse path, respectively, for a host unit of one embodiment of the present invention.
Figure 12B:
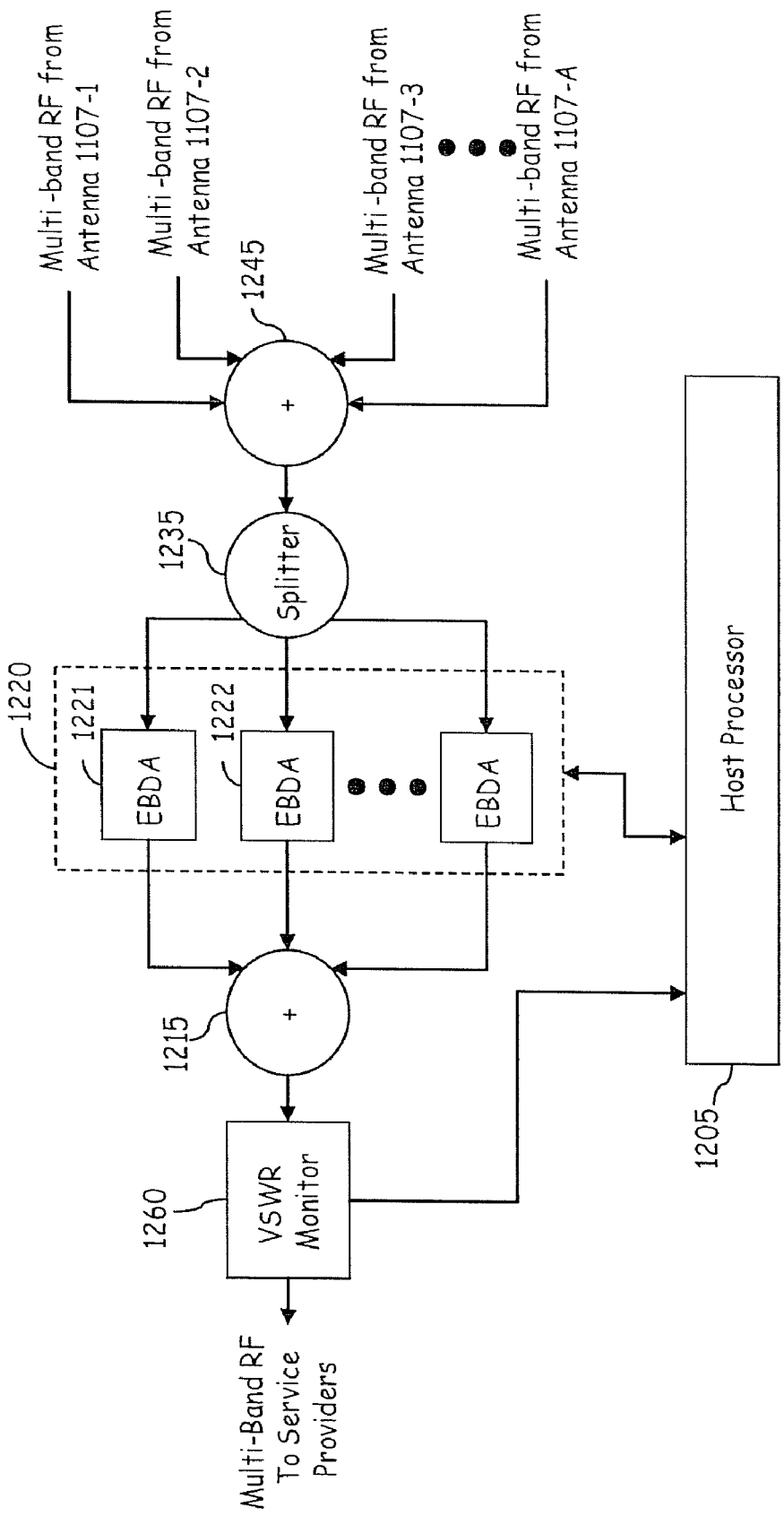

FIGS. 12A and 12B are block diagrams illustrating the flow of voice/data information through the analog RF transport of host unit 1110, in the forward and reverse path respectively.

As illustrated in FIG. 12A, in operation in the forward path host unit 1110 receives RF signals transmitted by one or more of cellular communications service provider 131, wireless network 137, and other services 136, as multiple signals in different RF frequency bands. In one embodiment, these RF signals are received by host unit 1210 as a single multi-band RF signal. In one embodiment, host unit 1210 incorporates multiple signals into a single multi-band RF signal. As would be appreciated by one skilled in the art upon reading this specification, because data from each service provider is communicated within separate RF frequency bands assigned to each service provider, combining analog RF signals from each service provider into a single multi-band RF signal is readily accomplished without data distortion due to signal overlap.

The multi-band RF signal is received at splitter 1210 and forwarded to a plurality enhanced bidirectional amplifier EBDA modules 1220. In one embodiment, each EBDA module is associated with a specific RF frequency band and performs signal processing on RF signals within that RF frequency band. For example, in one embodiment, EBDA module 1221 performs signal processing on RF signals within an 800-850 MHz frequency band, while EBDA module 1222 performs signal processing on RF signals within a 1.0-1.5 GHz frequency band. In one embodiment, EBDA modules 1220 separate their assigned specific RF frequency band from the multi-band RF signal. For example, in one embodiment, each of EBDA modules 1220 filters out RF signals that are outside of their assigned RF frequency band. The resulting output of each of EBDA modules 1220 is a processed single band RF signal. The output of the EBDA modules 1220 is combined back into a multi-band RF signal by RF signal combiner 1230. This multi-band RF signal is received at splitter 1240 and provided to each of antennas 1107-1 to 1107-A.

FIG. 12B illustrates the operation of the reverse path of host unit 1110 of one embodiment of the present invention. Host unit 1110 receives a plurality of multi-band RF signals from antennas 1107-1 to 1107-A and combines the several multi-band RF signals into a single multi-band RF signal at combiner 1245. The multi-band RF signal is received at splitter 1235 and forwarded to the plurality of EBDA modules 1220. As discussed above, each EBDA module is assigned to perform signal processing to RF signals within a specific RF frequency band. In one embodiment, EBDA modules 1220 separate their assigned specific RF frequency band from the multi-band RF signal. The RF frequency band assigned to each EBDA module in the reverse path is not necessarily the same RF frequency band assigned to that EBDA module in the forward path. For example, in one embodiment, EBDA module 1221 performs signal processing on RF signals in the reverse bath within an 900-950 MHz frequency band, while EBDA module 1222 performs signal processing on RF signals in the reverse path within a 2.0-2.5 GHz frequency band. The output of the EBDA modules 1220 is combined back into a multi-band RF signal by RF signal combiner 1215. Host unit 1110 transmits this multi-band RF signal output to service providers 130 via communications links 1125.

As would be appreciated by one skilled in the art upon reading this specification, forward and reverse path RF signals can be simultaneously transported as analog signals on the same physical transport. For example, in one embodiment, splitter 1240 and combiner 1245 may be incorporated into the same physical device that splits forward path RF signals as described above and combines reverse RF path signals as described above. Similarly, in one embodiment, splitter 1210 and combiner 1215 may be incorporated into the same physical device that splits forward path RF signals and combines reverse RF path signals. Combiner 1230 and splitter 1235 may be incorporated into the same physical device that combines forward path RF signals as described above and splits reverse RF path signals as described above.

Figure 13:
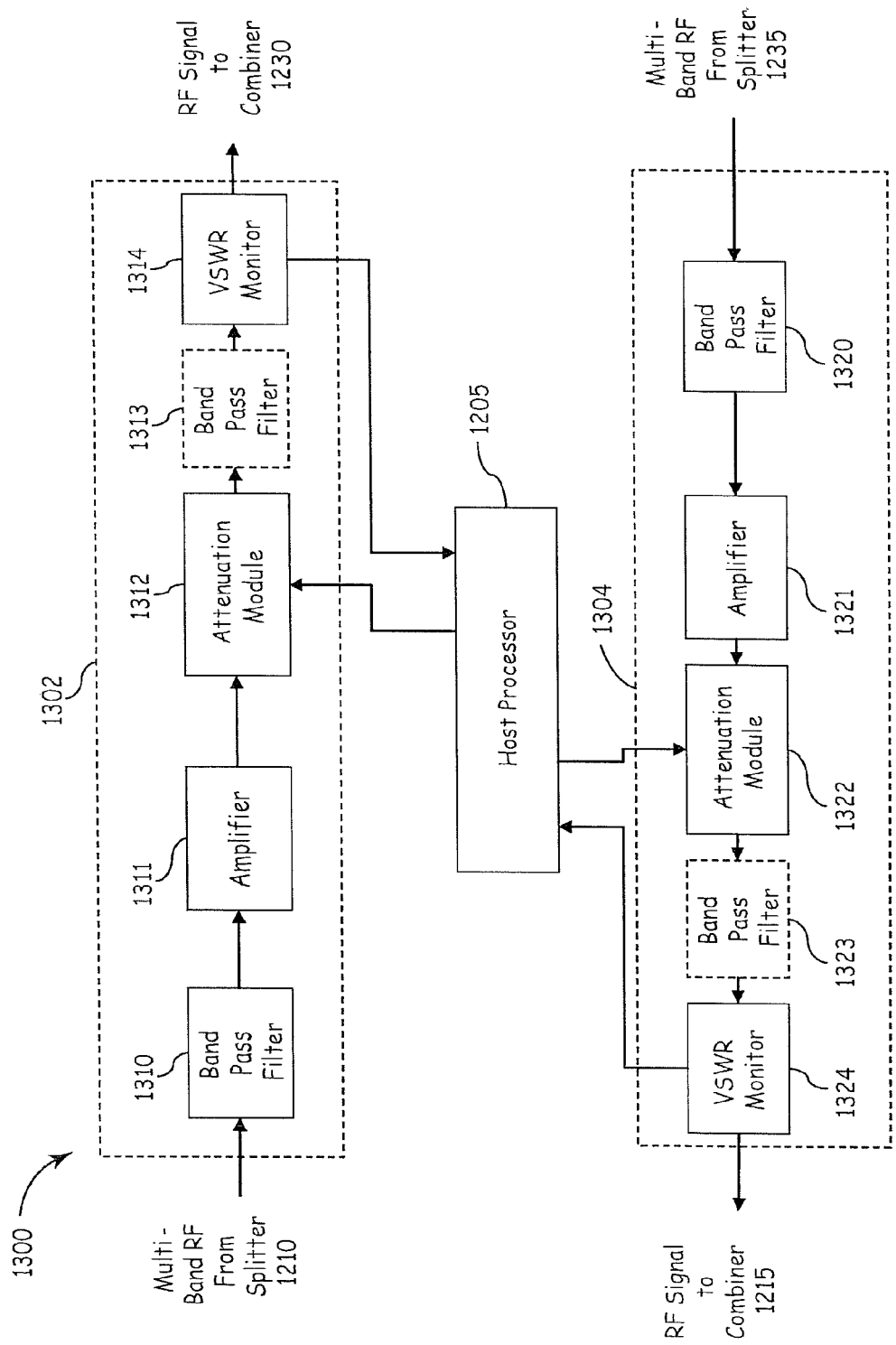
FIG. 13 is a block diagram illustrating a host unit enhanced bidirectional amplifier of one embodiment of the present invention.

FIG. 13 is a block diagram illustrating a host unit EBDA module 1300, such as EBDA modules 1220 discussed with respect to FIG. 12. EBDA module 1300 provides amplification for both forward and reverse path RF signals and performs several signal processing functions on RF signals in both the forward and reverse path. These signal processing functions include, but are not limited to signal attenuation control, footprint adjustment, input drive level adjustment, and dynamic monitoring and management of signal levels to prevent overdriving of electronics. In addition, EBDA module 1300 performs monitoring and control functions, such as RF signal power monitoring and software driven shutdown of an individual RF frequency band. EBDA module 3100 includes forward path functions 1302 and reverse path functions 1304.

In the forward path, EBDA module 1300 includes a band pass filter 1310, an amplifier 1311, a variable RF signal attenuation module 1312, and a voltage standing wave ratio (VSWR) monitor 1314. In operation in one embodiment, EBDA module 1300 receives a multi-band RF signal from splitter 1210 and band pass filter 1310 filters out RF signals outside the RF frequency band assigned to EBDA module 1300. Amplifier 1311 provides amplification to the filtered RF signal to ensure the RF signal power is adequate for transmitting via the antennas 1107-1 to 1107-A. Attenuation module 1312 receives the filtered RF signal and attenuates the RF signal based on instructions received from a host processor 1205 coupled to EBDA module 1300. VSWR monitor 1314 measures the signal power of the RF signal output from attenuation module 1312. In one embodiment, the RF signal is then provided to combiner 1230. In one embodiment, an optional band pass filter 1313 filters from the forward path RF signal any RF noise outside the RF frequency band assigned to EBDA module 1300, which may have been introduced by EBDA module 1300.

Based on the VSWR monitor 1314 power measurements, host processor 1205 can dynamically determine the RF signal power output for each of the EBDA modules 1220 in host 1110. Measuring the power output of each of the EBDA modules 1220 enables host processor 1205 to identify forward path power fluctuations and anomalies within specific RF frequency bands. Further, having a variable attenuator, such as attenuation module 1312, within each of EBDA modules 1220 enables host processor 1205 to adjust the signal power within a specific RF frequency band without necessarily altering the power levels of RF signals outside of that RF frequency band. In addition, host processor can shut down further processing of RF signals within any specific RF frequency band by adjusting the corresponding attenuation module 312 to provide a zero power level output.

In the reverse path, EBDA module 1300 includes a band pass filter 1320, a variable RF signal attenuation module 1322, and a voltage standing wave ratio (VSWR) monitor 1324. In operation in one embodiment, EBDA module 1300 receives a reverse path multi-band RF signal from splitter 1235 and band pass filer 1329 filters out RF signals outside the reverse path RF frequency band assigned to EBDA module 1300. Amplifier 1321 provides amplification to the filtered RF signal. Attenuation module 1322 receives the filtered RF signal and attenuates the RF signal based on instructions received from host processor 1205. VSWR monitor 1324 measures the signal power of the RF signal output from attenuation module 1312. In one embodiment, the RF signal is then provided to combiner 1215. In one embodiment, an optional band pass filter 1323 filters from the reverse path RF signal any RF noise outside the RF frequency band assigned to EBDA module 1300, which may have been introduced by EBDA module 1300.

Based on the VSWR monitor 1324 power measurements, the host processor 1205 can dynamically determine the reverse path RF signal power output from each of the EBDA modules 1220. Measuring the power output from each of the EBDA modules 1220, enables host processor 1205 to identify reverse path power fluctuations and anomalies within specific RF frequency bands. Further, control of the variable attenuation module (such as attenuation module 1322) within each of EBDA modules 1220 enables host processor 1205 to adjust the signal power within a specific RF frequency band without necessarily altering the power levels of RF signals outside of that RF frequency band. In addition, host processor can shut down further processing of RF signals within any specific reverse path RF frequency band by adjusting the corresponding attenuation module 322 to provide a zero power level output.

In addition to having VSWR modules located within each of EBDA modules 1220, in one embodiment, host unit 1110 includes VSWR modules 1250 and 1260. VSWR modules 1250 monitor the power level of the multi-band RF signal output from host unit 1110 onto each of antennas 1107-1 to 1107-A. VSWR modules 1250 thus enable host processor 1205 to dynamically monitor the forward path power level to each of antennas 1107-1 to 1107-A. VSWR module 1260 monitors the power level of the multi-band RF signal output from host unit 1110 to the service providers, enabling host processor 1205 to dynamically monitor its reverse path power output.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communications system, the system comprising:
    a host unit adapted to communicate with one or more service providers;
    at least one remote unit adapted to communicate with the host unit; and
    at least one communications medium coupled between the host unit and the at least one remote unit, wherein the host unit and the at least one remote unit are adapted to communicate analog RF signals via the at least one communications medium;
    wherein the host unit is adapted to receive a plurality of forward path RF signals from the one or more service providers as a first multiband RF signal including a first RF frequency band and one or more additional RF frequency bands;
    wherein the host unit is further adapted to separate the first RF frequency band from the first multi-band RF signal, vary a power level of the first RF frequency band, and recombine the first RF frequency band with the one or more additional RF frequency bands as a second multi-band RF signal;
    wherein the host unit further comprises a tone generator adapted to transmit a plurality of pilot tones onto the at least one communications medium;
    wherein the remote unit further comprises a tone receiver and a processor coupled to the tone receiver;
    wherein the tone receiver is adapted to receive the plurality of pilot tones from the at least one communications medium;
    wherein the processor is adapted to calculate a power loss for each of the plurality of pilot tones, determine a power loss versus RF frequency relationship for the at least one communications medium based on the calculated power loss of each of the plurality of pilot tones, and estimate a path loss for the first RF frequency band based on the power loss versus RF frequency relationship; and
    wherein the processor is further adapted to vary an attenuation of the first RF frequency band based on the estimated power loss for the first RF frequency band.

2. The system of claim 1, wherein the at least one remote unit is adapted to receive the second multi-band RF signal and separate the first RF frequency band from the second multi-band RF signal, vary a power level of the first RF frequency band, and recombine the first RF frequency band with the one or more additional RF frequency bands as a third multi-band RF signal.

3. The system of claim 2, wherein the at least one remote unit is adapted to wirelessly transmit the third multi-band RF signal to one or more mobile units.

4. The system of claim 1, wherein the at least one communications medium comprises on one or more of an optical fiber, a wire cable, and a wireless communications link.

5. The system of claim 1, where in the host unit further comprises:
    a host processor; and
    a plurality of enhanced bidirectional amplifier modules coupled to the host processor, wherein a first enhanced bidirectional amplifier module is adapted to receive the first multi-band RF signal and filter out RF signals from RF bands other than the first RF frequency band, wherein the first enhanced bidirectional amplifier module is further adapted to vary the RF power of the RF frequency band based on one or more signals from the host processor.

6. The system of claim 5, wherein the first enhanced bidirectional amplifier module is further adapted to measure a signal power of the first RF frequency band and communicate the signal power to the host processor.

7. The system of claim 1, wherein the at least one remote unit further comprises:
    a remote processor; and
    a plurality of remote enhanced bidirectional amplifier modules coupled to the remote processor, wherein a first remote enhanced bidirectional amplifier module is adapted to receive the second multi-band RF signal and filter out RF signals from RF bands other than the first RF frequency band, wherein the first remote enhanced bidirectional amplifier module is further adapted to vary the RF power of the first RF frequency band based on one or more signals from the remote processor.

8. The system of claim 7, wherein the first enhanced bidirectional amplifier module is further adapted to measure a signal power of the first RF frequency band and communicate the signal power to the remote processor.

9. The system of claim 1, wherein the host unit and the at least one remote unit are adapted to communicate RF modulated digital messages with each other via the at least one communications medium.

10. The system of claim 9, wherein the digital messages include one or more of configuration messages, alarm messages, and status messages.

11. A method for transporting analog multi-band RF signals, the method comprising:
    receiving a first multi-band RF signal from a first communications medium, the first multi-band RF signal including a first RF frequency band and one or more additional RF frequency bands;
    separating the first RF frequency band from the multi-band RF signal;
    varying a power level of the first RF frequency band;
    recombining the first RF frequency band with the one or more additional RF frequency bands into a second multi-band RF signal;
    transmitting the second multi-band RF signal on a second communications medium;
    receiving a plurality of pilot tones at a plurality of frequencies;

calculating a power loss for each of the plurality of pilot tones;
determining a power loss versus RF frequency relationship based on the calculated power loss for each of the plurality of pilot tones;
estimating a power loss for the first RF frequency band based on the power loss versus RF frequency relationship; and
varying an attenuation of the first RF frequency band based on the estimated power loss for the first RF frequency band.

12. The method of claim 11, wherein receiving the first multi-band RF signal further comprises receiving RF signals from one or more voice/data communication service providers.

13. The method of claim 12, further comprising:
limiting the power of the first multi-band RF signal based on a power threshold.

14. The method of claim 11, wherein transmitting the second multi-band RF signal on the second communications medium further comprises transmitting the second multi-band RF signal on one or more of an optical fiber, a wire cable, and a wireless communications link.

15. The method of claim 11, further comprising:
adjusting a footprint by varying the RF power level of the first RF frequency band.

16. The method of claim 11, further comprising:
receiving the second multi-band RF signal from the second communications medium;
separating the first RF frequency band from the second multi-band RF signal;
varying an RF power level of the first RF frequency band;
recombining the first RF frequency band with the one or more additional RF frequency bands into a third multi-band RF signal; and
wirelessly transmitting the third multi-band RF signal.

17. The method of claim 16, wherein wirelessly transmitting the third multi-band RF signal further comprises wirelessly communicating the third multi-band RF signal to one or more mobile units via one or more antennas.

18. The method of claim 16, farther comprising:
adjusting a footprint by varying the power level of the first RF frequency band.

19. A system for implementing automatic gain control for a communications medium, the system comprising:
means for receiving a plurality of pilot tones at a plurality of frequencies from a common communications medium;
means for calculating a power loss for each of the plurality of pilot tones, the means for calculating a power loss responsive to the means for receiving the plurality of pilot tones;
means for determining a power loss versus RF frequency relationship for the common communications medium based on the calculated power loss for each of the plurality of pilot tones, the means for determining the power loss versus RF frequency relationship responsive to the means for calculation the power loss;
means for estimating a power loss for an RF frequency band based on the power loss versus RF frequency relationship, the means for estimating a power loss for an RF frequency band responsive to the means for determining a power loss versus RF frequency relationship; and
means for varying a power level of one or more RF signals in the RF frequency band based on an estimated power loss for the RF frequency band, the means for varying the power level responsive to the means for estimating the power loss.

20. The system of claim 19, wherein the means for determining a power loss versus RF frequency relationship is adapted to calculate a best fit curve equation based on a calculated power loss for each of the plurality of pilot tones.

21. The system of claim 19 further comprising:
means for generating the plurality of pilot tones at a plurality of frequencies; and
means for transmitting the plurality of pilot tones on the common communications medium, the means for transmitting responsive to the means for generating.

* * * * *

UNITED STATES PATENT AND TRADEMARK OFFICE
CERTIFICATE OF CORRECTION

| | | |
|---|---|---|
| PATENT NO. | : 7,599,711 B2 | Page 1 of 1 |
| APPLICATION NO. | : 11/279480 | |
| DATED | : October 6, 2009 | |
| INVENTOR(S) | : Hermel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 760 days.

Signed and Sealed this

Twenty-eighth Day of September, 2010

David J. Kappos
*Director of the United States Patent and Trademark Office*